(12) United States Patent
Sankrithi et al.

(10) Patent No.: US 9,108,719 B2
(45) Date of Patent: Aug. 18, 2015

(54) AIRCRAFT WITH AFT SPLIT-LEVEL MULTI-DECK FUSEALGE

(71) Applicant: The Boeing Company, Seal Beach, CA (US)

(72) Inventors: Mithra M. K. V. Sankrithi, Lake Forest Park, WA (US); Sergey D Barmichev, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 52 days.

(21) Appl. No.: 13/973,843

(22) Filed: Aug. 22, 2013

(65) Prior Publication Data
US 2013/0334368 A1    Dec. 19, 2013

Related U.S. Application Data

(63) Continuation-in-part of application No. 12/716,606, filed on Mar. 3, 2010.

(51) Int. Cl.
*B64D 11/06* (2006.01)
*B64C 1/18* (2006.01)
(Continued)

(52) U.S. Cl.
CPC ... *B64C 1/20* (2013.01); *B64C 1/00* (2013.01); *B64D 11/00* (2013.01); *B64D 11/0601* (2014.12); *B64C 2001/0027* (2013.01); *B64D 11/003* (2013.01)

(58) Field of Classification Search
CPC .............. B64C 2001/0027; B64D 11/00
USPC ............ 244/118.1, 118.5, 118.6, 119
See application file for complete search history.

(56) References Cited

U.S. PATENT DOCUMENTS

| 1,859,807 | A | * | 5/1932 | Stout | 244/119 |
| D92,189 | S | * | 5/1934 | Minshall et al. | D12/341 |

(Continued)

FOREIGN PATENT DOCUMENTS

| EP | 2460727 | 6/2012 |
| WO | WO2006005550 A1 | 1/2006 |
| WO | WO2008132087 A1 | 11/2008 |

OTHER PUBLICATIONS

Bauhaus Luftfahrt, Paper, MTU Press Conference, Munich, Jul. 18, 2007.*

(Continued)

*Primary Examiner* — Tien Dinh
*Assistant Examiner* — Steven Hawk
(74) *Attorney, Agent, or Firm* — Parsons Behle & Latimer

(57) ABSTRACT

An aircraft capable of carrying passengers and cargo includes a fuselage, having a crown section and a keel, a first passenger cabin, having a first floor, located in a forward portion the fuselage, and a first cargo deck, located below at least a portion of the first passenger cabin. A split level cabin is located in an aft portion of the fuselage, the split level cabin including an upper second cabin having a second floor above the level of the first floor, and a lower third cabin beneath the upper second cabin and having a third floor below the level of the first floor. A second cargo deck is located in the aft portion of the fuselage and beneath at least a portion of the lower third cabin. The crown section has a substantially constant cross-sectional shape fore-to-aft above the first passenger cabin and the split level cabin, and the keel below the second cargo deck is lowered compared to the keel below the first cargo deck. A modified aircraft having a split level aft cabin and lowered keel, and a method for modifying an aircraft in this way are disclosed.

20 Claims, 17 Drawing Sheets

(51) Int. Cl.
  *B64C 1/20* (2006.01)
  *B64D 11/00* (2006.01)
  *B64C 1/00* (2006.01)

(56) References Cited

U.S. PATENT DOCUMENTS

| | | | | |
|---|---|---|---|---|
| 2,236,482 | A * | 3/1941 | Zindel | 244/119 |
| 2,281,581 | A * | 5/1942 | Horton | 105/327 |
| 2,761,637 | A * | 9/1956 | Harold et al. | 244/118.5 |
| 3,948,459 | A | 4/1976 | Schoeneman | |
| 4,022,404 | A * | 5/1977 | Greiss | 244/118.5 |
| 4,055,317 | A * | 10/1977 | Greiss | 244/118.5 |
| 4,066,227 | A * | 1/1978 | Buchsel | 244/118.6 |
| 4,641,796 | A | 2/1987 | Feifel | |
| 4,653,707 | A * | 3/1987 | Hamilton et al. | 244/137.2 |
| 5,063,859 | A * | 11/1991 | Rader | 105/340 |
| 5,086,996 | A * | 2/1992 | Roeder et al. | 244/119 |
| 5,115,999 | A * | 5/1992 | Buchsel et al. | 244/118.5 |
| 5,314,143 | A * | 5/1994 | Luria | 244/118.1 |
| 5,395,075 | A * | 3/1995 | Sprenger et al. | 244/118.5 |
| 5,474,260 | A * | 12/1995 | Schwertfeger et al. | 244/118.5 |
| 5,496,000 | A * | 3/1996 | Mueller | 244/118.1 |
| 5,540,404 | A * | 7/1996 | Battenfield | 244/129.5 |
| 5,716,026 | A * | 2/1998 | Pascasio et al. | 244/118.6 |
| 5,752,673 | A * | 5/1998 | Schliwa et al. | 244/118.6 |
| 5,784,836 | A | 7/1998 | Ehrick | |
| 5,875,997 | A * | 3/1999 | Al-Sabah | 244/118.5 |
| 5,992,797 | A * | 11/1999 | Seidel et al. | 244/118.5 |
| 6,056,239 | A * | 5/2000 | Cantu et al. | 244/118.6 |
| 6,073,883 | A | 6/2000 | Ohlmann et al. | |
| 6,152,400 | A | 11/2000 | Sankrithi et al. | |
| 6,237,872 | B1 * | 5/2001 | Bar-Levav | 244/118.6 |
| 6,478,253 | B1 * | 11/2002 | Seidel | 244/119 |
| 6,616,098 | B2 * | 9/2003 | Mills | 244/118.5 |
| 6,666,406 | B2 | 12/2003 | Sankrithi et al. | |
| 6,702,232 | B2 | 3/2004 | Dovey et al. | |
| 6,705,567 | B2 * | 3/2004 | Dong et al. | 244/13 |
| 6,772,977 | B2 * | 8/2004 | Dees et al. | 244/118.1 |
| 6,808,142 | B2 * | 10/2004 | Oki | 244/118.1 |
| 7,290,735 | B2 * | 11/2007 | Saint-Jalmes et al. | 244/118.6 |
| 7,395,989 | B2 * | 7/2008 | Saint-Jalmes et al. | 244/118.1 |
| 7,536,958 | B2 * | 5/2009 | Bravo et al. | 105/392.5 |
| 7,621,482 | B2 | 11/2009 | Sankrithi et al. | |
| 7,644,888 | B2 * | 1/2010 | Eakins et al. | 244/119 |
| 8,608,108 | B2 * | 12/2013 | Boren et al. | 244/118.5 |
| 2002/0033432 | A1 * | 3/2002 | Mikosza | 244/118.6 |
| 2002/0153454 | A1 * | 10/2002 | Seidel | 244/119 |
| 2003/0029967 | A1 * | 2/2003 | Mills | 244/118.5 |
| 2007/0125909 | A1 * | 6/2007 | Seiersen et al. | 244/118.5 |
| 2008/0179457 | A1 * | 7/2008 | Guering | 244/118.5 |
| 2008/0191087 | A1 | 8/2008 | Cros | |
| 2008/0245925 | A1 | 10/2008 | Udall | |
| 2008/0251641 | A1 * | 10/2008 | Sprenger | 244/118.5 |
| 2008/0309201 | A1 | 12/2008 | Ota | |
| 2010/0155531 | A1 * | 6/2010 | Lynas | 244/118.5 |
| 2012/0138743 | A1 * | 6/2012 | Boren et al. | 244/118.5 |
| 2014/0166807 | A1 * | 6/2014 | Boren et al. | 244/118.5 |

OTHER PUBLICATIONS

"Imagining the aircraft of the future", Prof. Dieter Schmitt / Bauhaus Luftfahrt, ASD Focus, Issue 04, Summer 2009, pp. 14-15.*
Prof. Dr. Mirko Hornung / Bauhaus Luftfahrt, "Aviation in 2030+: Visions, Concepts and Chances of Realisation", Nov. 23, 2011, Presentation, Royal Aeronautical Society, Toulouse Branch, pp. 26-29.*
US Patent and Trademark Office; Final Office Action for U.S. Appl. No. 12/716,606 dated Nov. 23, 2012.
Jal—Japan Airlines "MD-11/MD-11 Stretch, Executive Briefing for JAL," McDonnell Douglas, Dec. 1989, Presentation, pp. 1-10.
Bauhaus Luftfahrt, "Claire Liner," Prof. Frediani, Universit' di Pisa, and Atena Engineering GmbH, 2008, Presentation, pp. 1-12.
US Patent and Trademark Office; Non-Final Office Action for U.S. Appl. No. 12/716,606 dated Apr. 12, 2012.
Swihart, John M. et a; "Low Direct Operating Cost Transpacific Commercial Transport Family," American Institute of Aeronautics, Inc., 1997.
Duran, David, et al; The AC-120; "The Advanced Commercial Transport Preliminary Design of a 100 to 150 Passenger Commercial Transport;" Presented to Professor Robert van't Reit; Aeronautical Engineering Department, California Polytechnic State University, San Luis Obispo, CA; May 14, 1993.
Beal, Pamela, et al; VLCT-13, "A Commercial Transport for the 21st Cetnry;" California Polytechnic State University, San Luis Obispo, CA; May 14, 1993, NASA Technical Report No. NASA-CR-195492.
European Patent Office; Search Report for EP Application No. 14172650.5 dated Nov. 12, 2014.

* cited by examiner

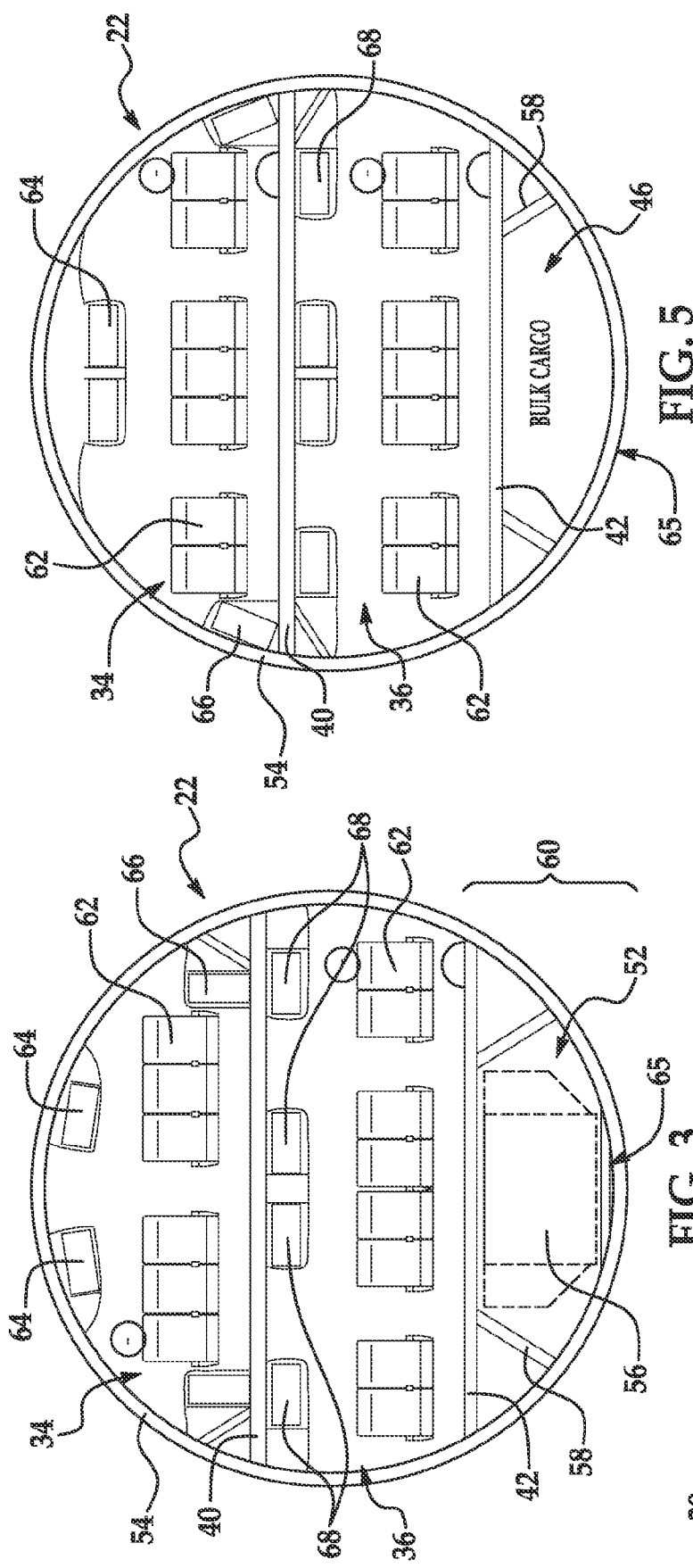
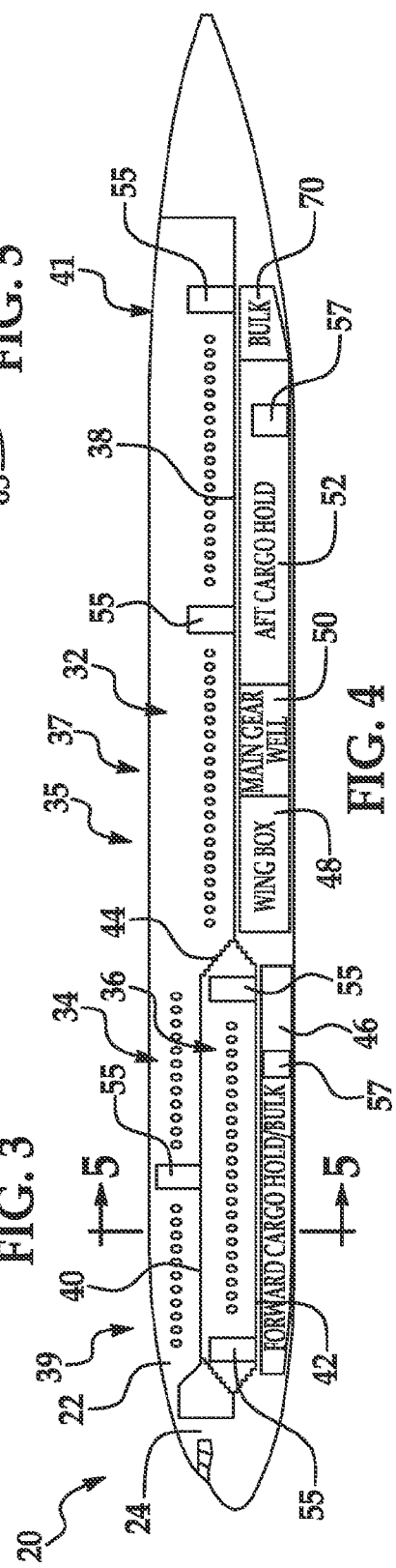

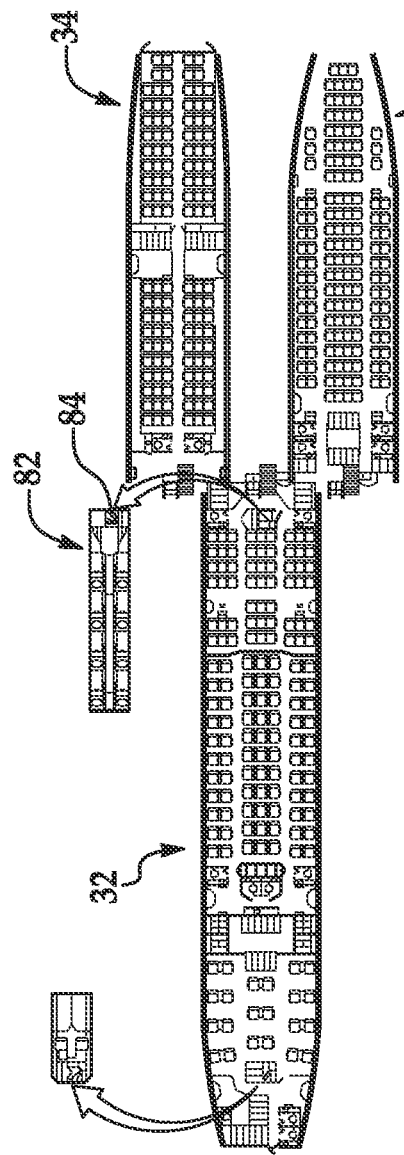
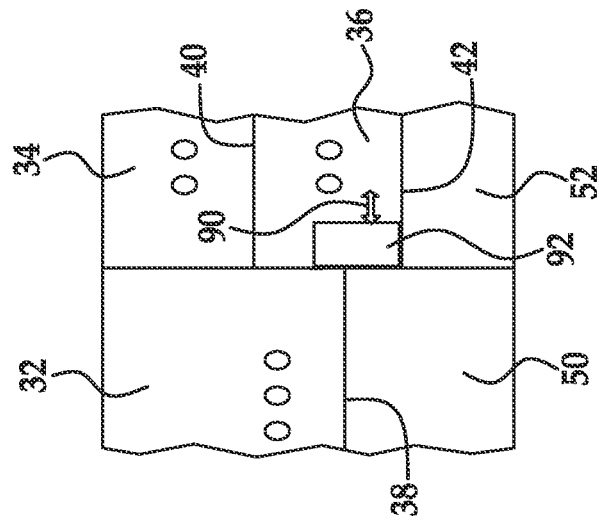
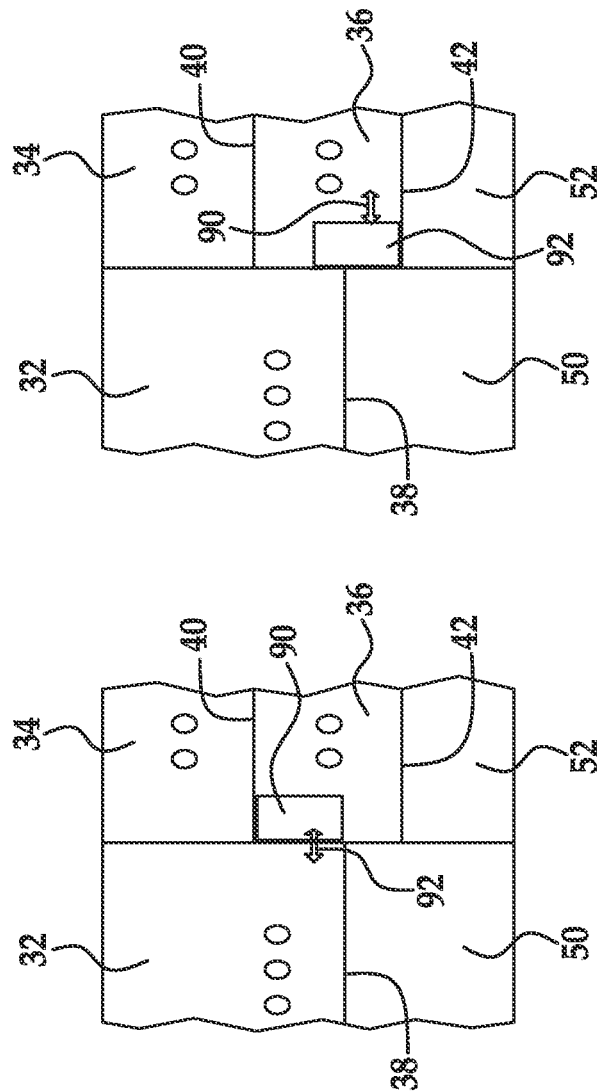
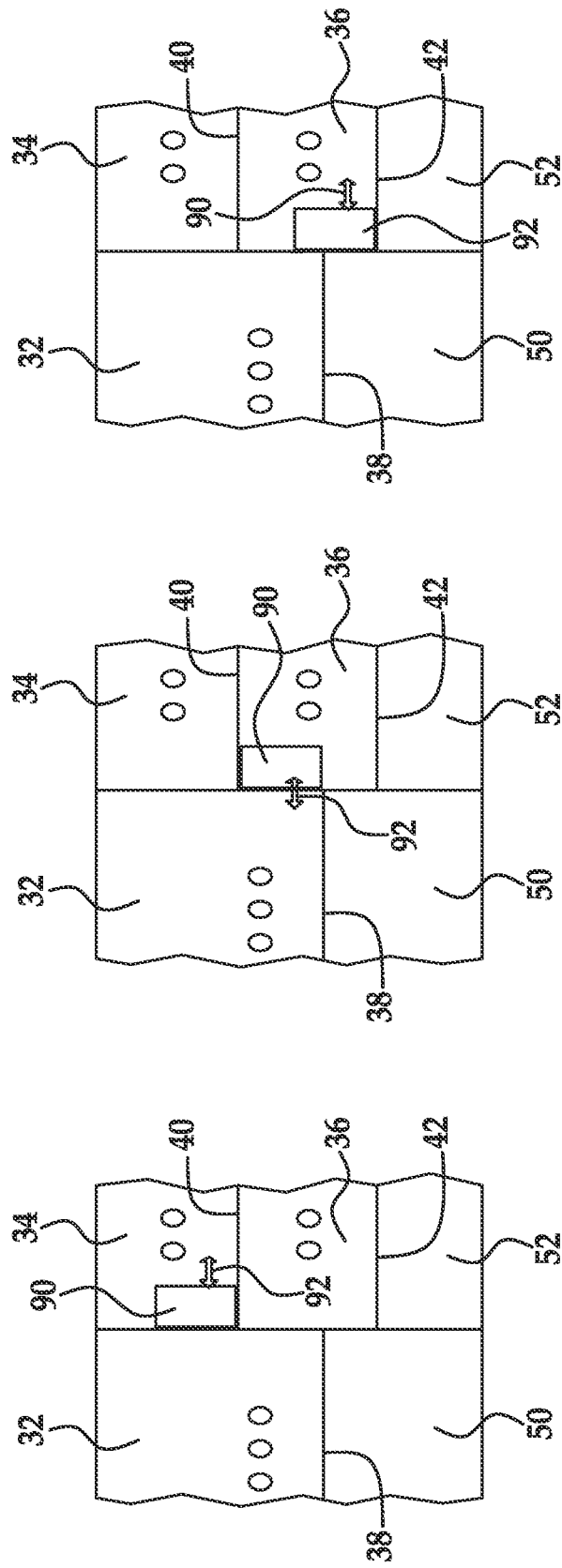

AIRCRAFT WITH AFT SPLIT-LEVEL MULTI-DECK FUSEALGE

PRIORITY CLAIM

The present application is a continuation-in-part of copending U.S. patent application Ser. No. 12/716,606, filed Mar. 3, 2010 and entitled AIRCRAFT HAVING SPLIT LEVEL CABIN FLOORS, the disclosure of which is incorporated herein by reference in its entirety.

TECHNICAL FIELD

This disclosure generally relates aircraft fuselage configurations and cabin layouts, and deals more particularly with a split level cabin floor configuration.

BACKGROUND

The operating efficiency of commercial and military aircraft may depend upon the efficient use of the volume of space within the aircraft's fuselage. Optimizing the use of fuselage volume may allow the aircraft to carry higher payloads of passengers and/or cargo. The ability to carry higher revenue payloads reduces operating expenses relative to revenue, while simultaneously reducing fuel burn per seat-kilometer and/or tonne-kilometer, and also reducing $CO_2$ production per seat-kilometer and/or tonne-kilometer. The challenge of optimizing the use of available fuselage volume is complicated by the need to provide for passenger comfort and safety while accommodating associated cargo requirements. Finally, passenger cabin layout and design must take into consideration the need for crash landing energy absorption in lower areas of the fuselage.

Two approaches that have been used in the past to increase passenger capacity of existing aircraft are to stretch the aircraft body, or increase the passenger abreast count. The former approach can keep the ratio of the passenger seat count and cargo capacity roughly the same, but can also change aircraft takeoff and landing parameters, and sometimes involves a redesign of aircraft wings and/or the use of different engines. The latter approach can involve the use of narrower aircraft seats and/or local carving of body frames inboard. Unfortunately, this approach generally reduces passenger comfort, and can involve significant redesign of aircraft structural components.

Accordingly, there is a need for an aircraft fuselage that optimizes use of fuselage volume while increasing passenger capacity and satisfying the need for passenger safety and comfort with adequate cargo storage. The disclosed embodiments are intended to address one or more of the above issues.

SUMMARY

The disclosed embodiments provide a fuselage design and cabin layout that optimizes use of the fuselage volume while satisfying the need for crash worthiness and cargo carrying requirements. A split level cabin floor layout within a fuselage of uniform cross section provides maximum passenger seating capacity. Cargo decks beneath passenger seating areas provide crushable zones that absorb energy during crash landings in order to protect passengers. The split level cabin layout includes upper and lower stacked cabins connected to an intermediate level main cabin through one or more sets of stairs, elevators or escalators. In one embodiment, a second set of stairs allows passengers to traverse between the upper and lower cabins without passing through the main cabin. Stairs connecting the main cabin to the upper and lower cabins may be longitudinally spaced, as required, to accommodate underlying cargo bays and/or landing gear wheel wells. In another embodiment, space above the main cabin is utilized as a rest compartment for crews that is accessible by stairs or ladders. In some embodiments, where the lower cabin is near the waterline of the aircraft, split "dutch" doors in the fuselage provide passenger egress while protecting against the inflow of water into the cabin in the event of an emergency water landing.

According to one disclosed embodiment, an aircraft comprises a fuselage, a first cabin, a split level cabin longitudinally spaced from the first cabin and a lower hold. The split level cabin includes an upper second cabin and a lower third cabin. The lower hold is beneath at least a portion of the lower third cabin. The first cabin has a first floor and the second cabin has a second floor that is above the level of the first floor. The third cabin has a third floor below the level of the first floor. In one example, the second and third cabins are located forward of the first cabin, while in another embodiment, the second and third cabins are located aft the first cabin. The aircraft may further comprise means for allowing passengers to traverse between the first cabin and each of the second and third cabins, which may include at least one of stairs, an escalator and an elevator. The aircraft may further comprise a first cargo deck located beneath the first cabin floor. The aircraft may further comprise at least one set of stairs allowing passengers to traverse directly between the second and third cabins without traversing through the first cabin.

According to another embodiment, an aircraft comprises a fuselage, a first cabin having a first floor and a split level cabin longitudinally spaced from the first cabin. The split level cabin includes an upper second cabin having a second floor above the first floor and a lower third cabin having a third floor below the level of the first floor. The aircraft further comprises means for allowing passengers and crew to traverse between the first cabin and each of the second and third cabins, and an upper compartment stacked above the first cabin, wherein the upper compartment has a fourth floor above the level of the second floor. Means, such as stairs or a ladder are provided for allowing passengers and crew to traverse between the second cabin and the upper compartment.

According to still another embodiment, an aircraft comprises a fuselage, a first cabin in the fuselage having a first floor, and a split level cabin longitudinally spaced from the first cabin. The split level cabin includes an upper second cabin having a second floor above the level of the first floor, and a lower third cabin beneath the upper second cabin and having a third floor below the level of the first floor. The aircraft further comprises powered transport means for vertically transporting payloads between the first, second and third cabins. The powered transport means may comprise an elevator longitudinally positioned within the fuselage between the first cabin and the split level cabin.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 3 is an illustration of a sectional view taken along the line 3-3 in FIG. 2.

FIG. 4 is an illustration similar to FIG. 2 but showing an alternate embodiment of the split level cabin layout.

FIG. 5 is an illustration of a sectional view taken along the line 5-5 in FIG. 4.

FIG. 15 is an illustration of a plan view of an aircraft having split level which includes the overhead crew rest area shown in FIG. 14.

FIGS. 16A-16C are illustrations of diagrammatic side views of an aircraft having split level cabins employing an elevator.

DETAILED DESCRIPTION

Figure 1:
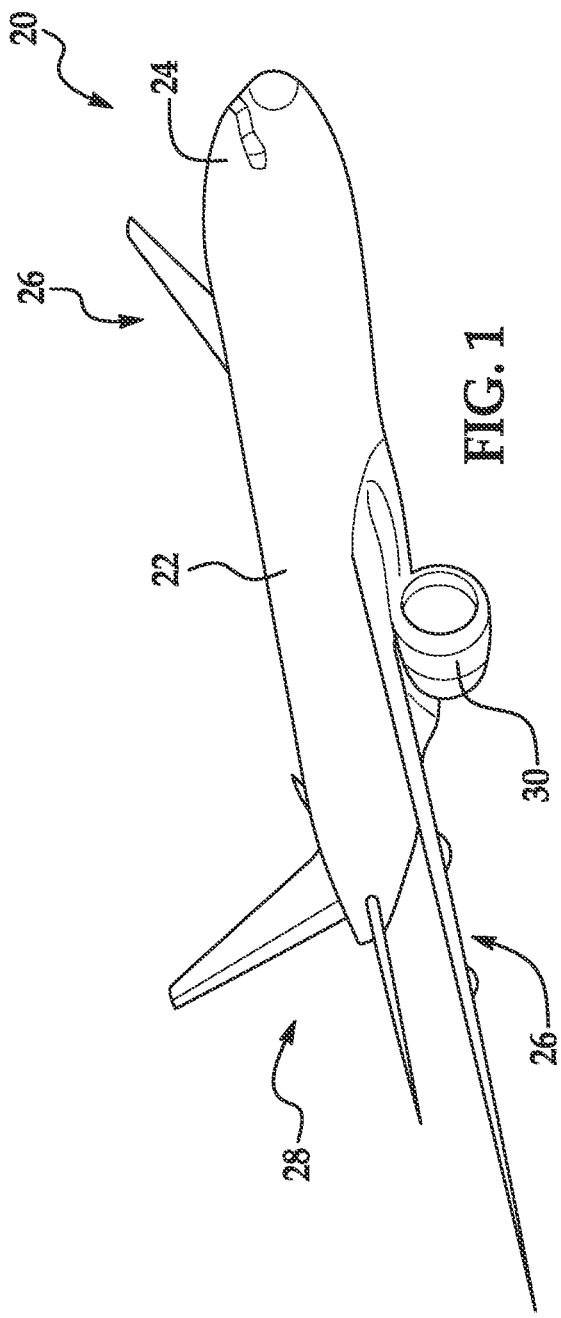
FIG. 1 is an illustration of a perspective view of a typical aircraft having a fuselage employing a split level cabin configuration according to the disclosed embodiments.
Figure 2:
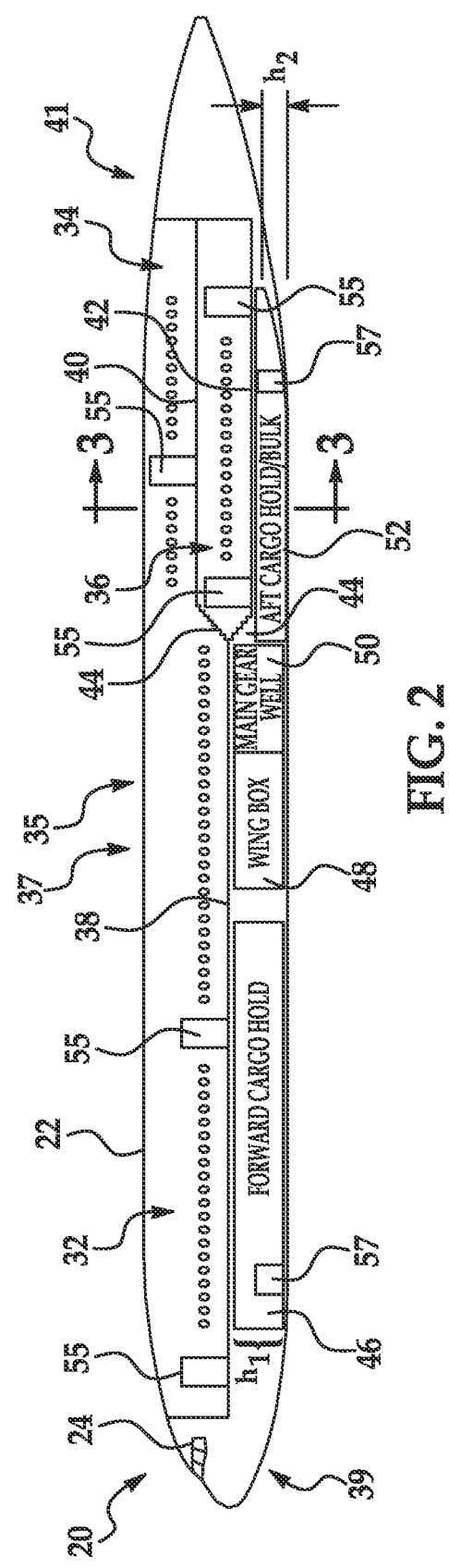
FIG. 2 is an illustration of a side view of the aircraft shown in FIG. 1, partially in section with the wings and tail assembly removed for clarity.

Referring first to FIGS. 1-3, an aircraft 20 comprises a generally cylindrical fuselage 22 having an attached wing assembly 26 and a tail assembly 28. In the illustrated example, the aircraft 20 is propelled by jet engines 30 mounted on the wing assembly 26, as best seen in FIG. 1. The aircraft 20 may carry any of various types of payloads, including cargo and passengers. As used herein, the term "passengers" is intended to include all forms of passengers including crews, pilots, attendants and service personnel.

Referring now particularly to FIGS. 2 and 3, the fuselage 22 broadly includes a forwardly positioned crew cockpit 24 and a split level cabin layout 35 comprising a first, main level cabin 32 positioned immediately aft of the cockpit 24, and upper and lower, second and third cabins 34, 36 positioned between the main cabin 32 and the tail assembly 28 (FIG. 1). Cabins 32, 34 and 36 respectively include cabin floors 38, 40 and 42 for supporting passenger seats 62 and/or cargo.

Although not shown in the figures, each of the floors 38, 40, 42 may have embedded hardware for attaching payloads to the floors 38, 40, 42. For example, one or more of the floors 38, 40, 42 may have multiple seat tracks (not shown) that allow the passenger seats 62 to be attached to the floors 38, 40, 42 in various flexible configurations, and which allow the seats 62 to be removed in order to allow other forms of payloads, such as cargo, to be carried in the cabins 32, 34, 36. The upper cabin floor 40 is positioned above the level of the main cabin floor 38, while the lower cabin floor 42 is positioned below the level of the main cabin floor 38. Cabin floors of different or varying depth may be used to best optimize cabin heights relative to floor structure weight.

The upper and lower cabins 34, 36, are vertically stacked and are respectively are connected with each other, and with the main cabin 32 by two flights of stairs 44 which, in the illustrated example are longitudinally aligned within the fuselage 22. Flights of stairs that are transversely aligned or are aligned at an angle or are curved/nonlinear are also possible in variant embodiments. Stairs 44 provide a means of allowing passengers to traverse between cabins 32, 34 and 36. The number of stairs in each flight thereof may be the same or different. In those embodiments where the two flights have a different number of stairs 44, the upper and lower cabin floors 40, 42 respectively, will be at different heights relative to the main cabin floor 38.

In typical embodiments, the upper floor 40 may be displaced between 5 and 75 inches above the level of the first cabin floor 38, and each of the flights of stairs 44 may comprise between 1 and 15 stairs. Varying values of step rise and step length and step overhang are possible for variant embodiments. Similarly, the lower floor 42 may be displaced between 5 and 75 inches below the level of the first cabin floor 38, and the stairs connecting the first main cabin 32 with the lower aft cabin 36 may comprise between 1 and 15 stairs. Although not shown in FIGS. 2 and 3, an elevator, escalator or other means of transporting passengers between the floors 38, 40, 42 are possible. Similarly, although not shown in FIGS. 2 and 3, galley cart lift(s) may be provided as means for transporting galley carts such as galley carts and beverage carts between the floors 38, 40 and 42. In the illustrated example, doors 55 are provided in cabins 34 and 36 to allow emergency passenger egress and/or servicing of the cabins.

A first cargo deck comprising a first forward cargo deck or hold 46 is disposed beneath the main cabin floor 38. The forward cargo deck 46 has a volume partially defined by a height $h_1$ that will permit carrying standardized, full size LD-3 cargo containers as well as pallets and/or bulk cargo. The forward cargo deck 46 can be loaded with the cargo containers or pallets via a cargo door (not shown) on either the right or left side of the fuselage, as is well known in the art. A center wing box 48 and main landing gear wheel well 50 are positioned immediately aft of the forward cargo deck 46, beneath the main cabin floor 48. The wing box 48 forms part of a structure that mounts the wing assembly 26 (FIG. 1) on the fuselage 22. A lower aft hold 52 which may comprise an aft cargo hold or deck is positioned immediately aft of the main landing gear well 50, beneath the lower cabin floor 42. The lower hold 52 may include a door 57 allowing loading/unloading of cargo and has a height $h_2$ that may be less than the height $h_1$ of the forward cargo deck 46. While the door 57 is shown on the left side of the airplane fuselage, in alternate airplane configurations the door 57 may alternatively be located on the right side of the airplane.

The reduced height $h_2$ of the lower hold 52 accommodates the height required for the stacked aft cabins 34, 36, while still providing sufficient volume to accommodate smaller cargo, including bulk cargo, as well as some reduced height unit cargo devices from a set including LD3-45, LD3-45W, LD3-46, LD3-46W cargo container, and other containers between 20 and 60 inches in height. In alternate embodiments the lower aft hold 52 may comprise a reduced height volume that is adapted to accommodate selected airplane systems (including but not limited to line-replaceable-units or LRUs, avionics systems, flight controls systems, environmental control systems, entertainment systems, sensor systems, water systems, waste systems, electrical systems, hydraulic systems, pneumatic systems, oxygen systems, fire suppression systems, and/or auxiliary power systems), rather than bulk cargo or unit cargo devices.

A typical reduced height door 57 that would accommodate reduced height LD3-45 containers may have a height of approximately 49 inches and a width of approximately 65 inches. In contrast, a typical full height cargo pallet door 57 in the forward cargo deck 46 may have a height of approximately 69 inches and a width of approximately 105 inches.

FIG. 3 illustrates a typical seating layout wherein the lower cabin 36 is provided with 8-abreast twin-aisle seating and the upper cabin 34 is provided with 6-abreast single-aisle seating. Seats 62 in the upper cabin 34 are supported on and attached to the upper cabin floor 40, while seats 62 in the lower cabin 36 are attached to and supported on the lower cabin floor 42, using seat tracks (not shown) or other known methods of attaching seats to floors on aircraft. Seat tracks can be provided for permitting varying numbers of seats abreast with different seat sizes. For example if the illustrated 8-abreast twin-aisle seating in the lower cabin 36 has representative seat bottom widths of 18.5 inches, corresponding to a high-comfort economy class, alternate seating arrangements could be selectable options such as 9-abreast basic economy-class seats at 17 inches seat bottom width, or 7-abreast high-width business class seats or 6-abreast very-high-width first class sleeper seats or private modules.

Both the upper and lower cabins 34, 36 have a height sufficient to allow normal passenger standing and traversal. For example, these cabins may have aisleway maximum headroom of approximately 80 inches or greater to meet typical widebody aircraft standards, or at least approximately 72 inches or greater to meet minimum standards for small transport aircraft. The upper cabin 34 includes overhead storage bins 64 as well as side storage bins 66. Similarly, the lower cabin 36 includes overhead storage bins 68. Stowage bins may be shelf bins, pivot bins, translating bins or other stowage bin types known in the art. As mentioned above, the lower aft hold 52 may comprise an aft cargo deck beneath the lower cabin floor 42 which may accommodate reduced height cargo containers 56, as well as bulk cargo. The volume of the fuselage 22 below the lower cabin floor 42 which contains the aft cargo deck 52 may include various framework, such as stanchions 58 which both support the lower cabin floor 42 and aid in absorbing impact energy within a crushable zone 60 at the bottom of the fuselage 22 during a crash landing. Preferably, the fuselage 22 includes at least approximately 30 vertical inches of lower fuselage structure between the upper surface of the lower cabin floor 42 and the lower keel surface 65 of the fuselage 22.

The fuselage 22 will also accommodate systems (not shown) such as heating, ventilation and air conditioning systems, lighting systems, passenger service units and emergency systems, routing space for items such as electrical wiring, avionics and flight controls, control systems, hydraulic and/or pneumatic tubing, and a variety of payloads features and amenities such as seats, windows, lavatories, galleys, stowage etc.

In the example illustrated in FIGS. 1-3 the skin covered frame 54 that forms the cross sectional shape of the fuselage 22 is substantially circular, however, other cross sectional shapes such as an oval or piecewise-circular or other noncircular cross-sectional shapes are possible as well. The illustrated fuselage 22 has a main central body or section 39 that is of generally uniform cross section throughout its length, and tapered ends or sections 39, 41 that have a reduced diameter cross section. The cabins 32, 34, 36 are largely contained within the main body section 37 but may include portions that extend into the tapered ends 39, 41 of the fuselage 22.

FIGS. 4 and 5 illustrate another embodiment of a fuselage 22 having a split level cabin 35 in which the upper and lower stacked cabins 34, 36 are positioned forward in the fuselage 22, between the wing box 48 and the cockpit 22. In this example, the forward cargo deck 46 is of reduced height to accommodate the standing room height required within upper and lower cabins 34 and 36 which are stacked above the forward cargo deck 46. The main cabin 32 is positioned in an aft section of the fuselage 22, above the wing box 48, main landing gear well 50 and aft cargo hold 52, which may be of a height greater than that of the forward cargo deck 46 in order to accommodate full size cargo containers. In this example, an additional cargo hold 70 behind the aft cargo deck 52 may be possible for storing bulk cargo. The upper and lower cabins 36 are connected with the main aft cabin 32 by means of two flights of stairs 44.

FIG. 5 illustrates one seating layout for the aircraft shown in FIG. 4, in which both the upper and lower cabins 34, 36 are provided with seats 62 arranged in a 7-abreast, twin-aisle configuration. As previously mentioned, the forward cargo deck 46 is of reduced height suitable for carrying bulk storage. Also, similar to the embodiment shown in FIGS. 1-3, the volume of the fuselage 22 beneath the lower cabin floor 42 may include various energy absorbing, reinforcing structures such as stanchions 58 in order to absorb impact energy during a crash landing. It should be noted here that the cross-section configuration shown in FIG. 5 could be combined with the split-level layout of FIG. 2, and the cross-section configuration of FIG. 3 could be combined with the split-level layout of FIG. 4, in further variant embodiments.

Figure 6:
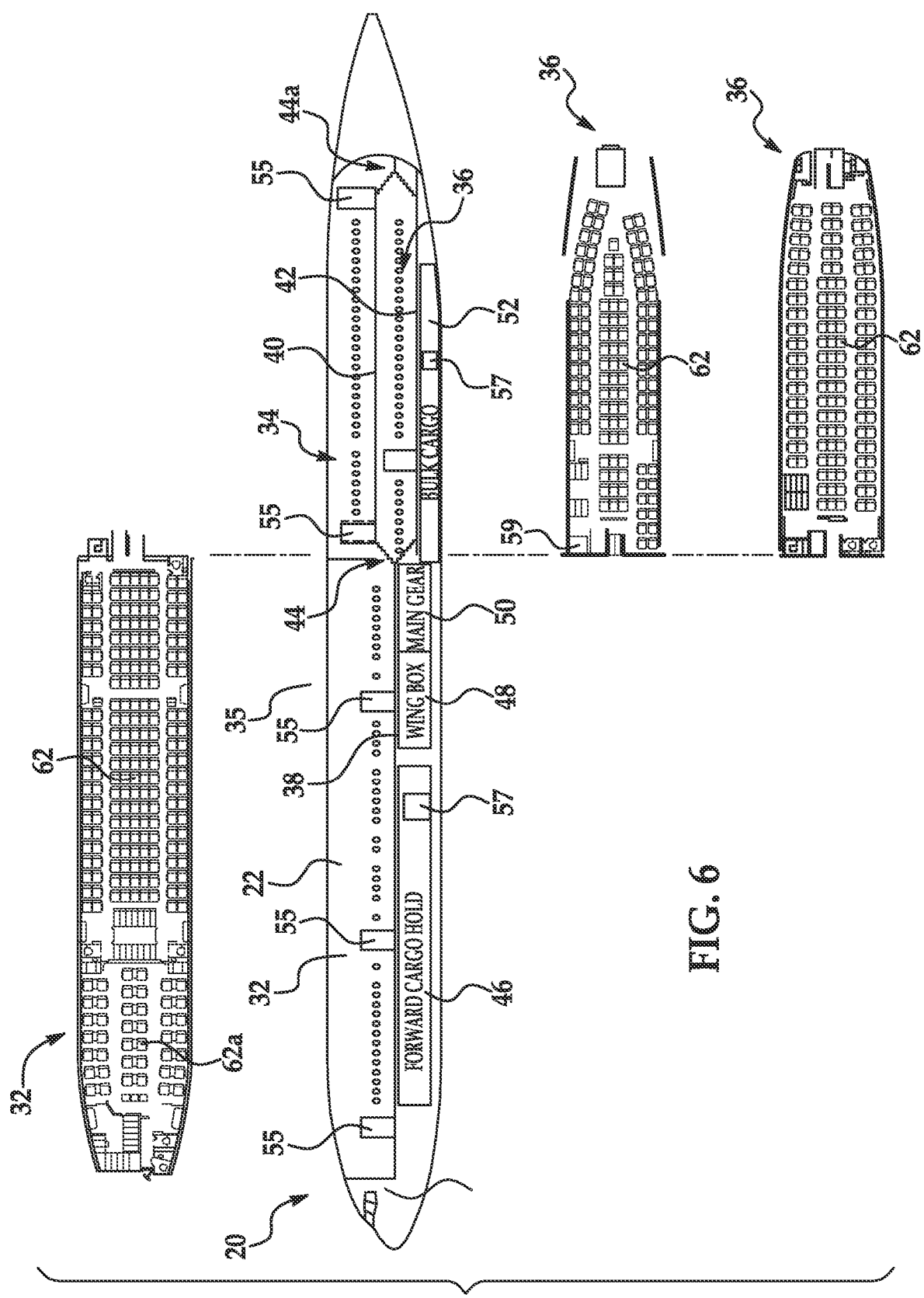
FIG. 6 is an illustration similar to FIG. 2 but showing alternate embodiments of connecting stairs and seat layouts for each of the cabins.

Attention is now directed to FIG. 6 which illustrates an aircraft 20 having a fuselage 22 provided with a split level cabin 35 similar to that shown in FIGS. 1-3, but with the provision of an additional set of stairs 44a at the aft end of the fuselage 22 which allows passengers to traverse directly between the upper and lower cabins 34, 36 without traversing the main cabin 22. Thus, passengers may traverse between the upper and lower cabins 34, 36 by using either the forward stairs 44 or the aft stairs 44a. As previously mentioned, it may also be possible to provide one or more elevators (not shown) or escalators (not shown) to allow passengers to traverse between cabins 32, 34 and 36 In this particular example, seating 62 is arranged in a double aisle configuration in cabins 32, 34 and 36. It should be noted here that because the upper and lower aft cabins 34, 36 are located between the wing box 48 and the tail assembly 28 (FIG. 1), emergency passenger egress through doors 55 in the fuselage in both cabin areas is free of obstructions. A cart lift 59 allows carts (not shown) to be vertically transported between floors 42 and 44.

Figure 7:
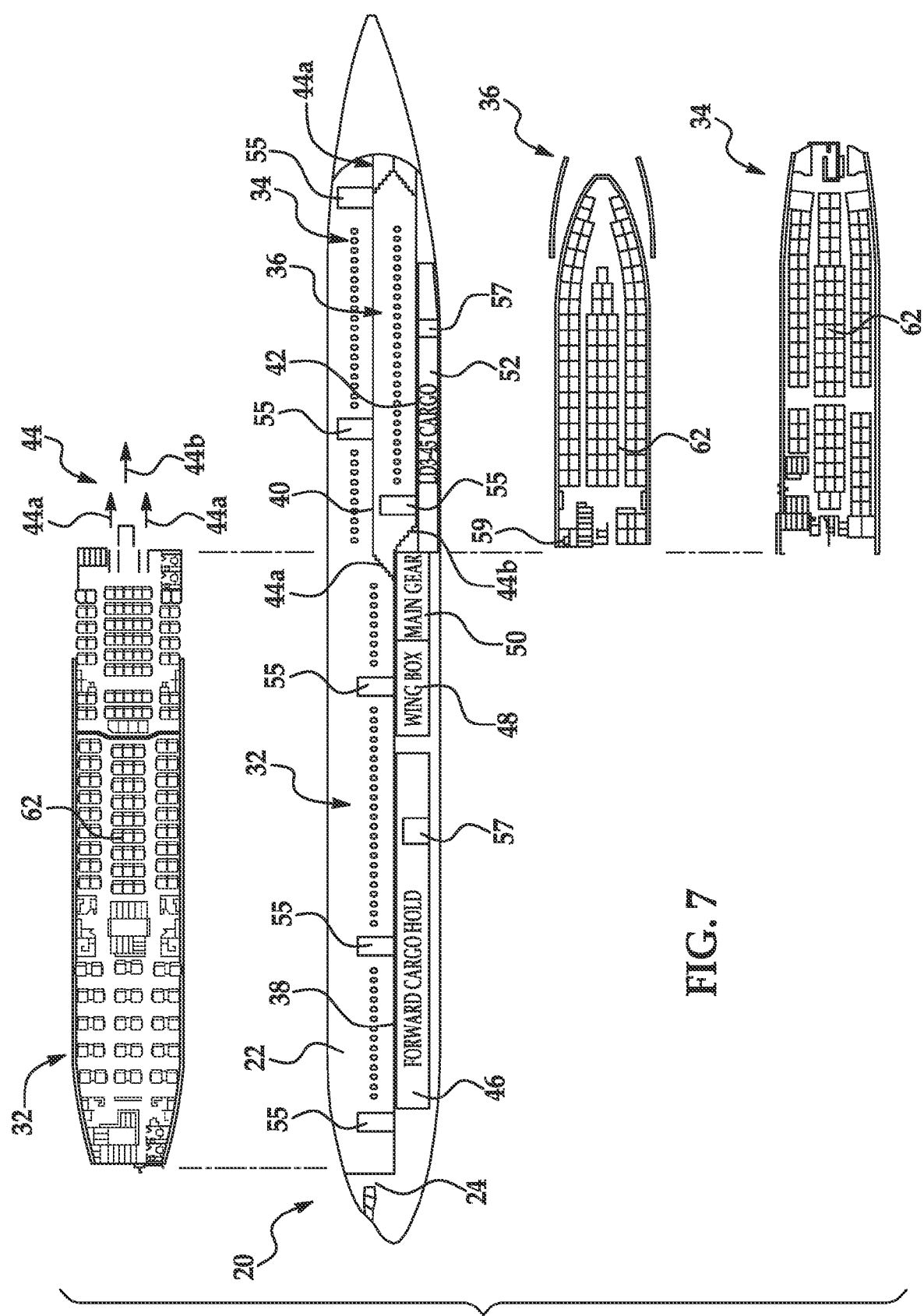
FIG. 7 is an illustration similar to FIG. 2 but showing alternate another embodiment of connecting stairs and seat layouts for each of the cabins.

Attention is now directed to FIG. 7 which illustrates a cabin layout generally similar to that shown in FIG. 6, but wherein the forward stairs 44 connecting the aft upper and lower cabins 34, 36 with the main forward cabin 32 are spaced or staggered relative to each other in the longitudinal direction of the fuselage of the aircraft 20. The forward stairs 44 comprises split, dual up stairs 44a, and extra wide, center down stairs 44b. The configuration shown in FIG. 7 may also include cart lifting means 59 for transporting galley carts between the levels of the cabin floors 38, 40, 42.

Figure 8:
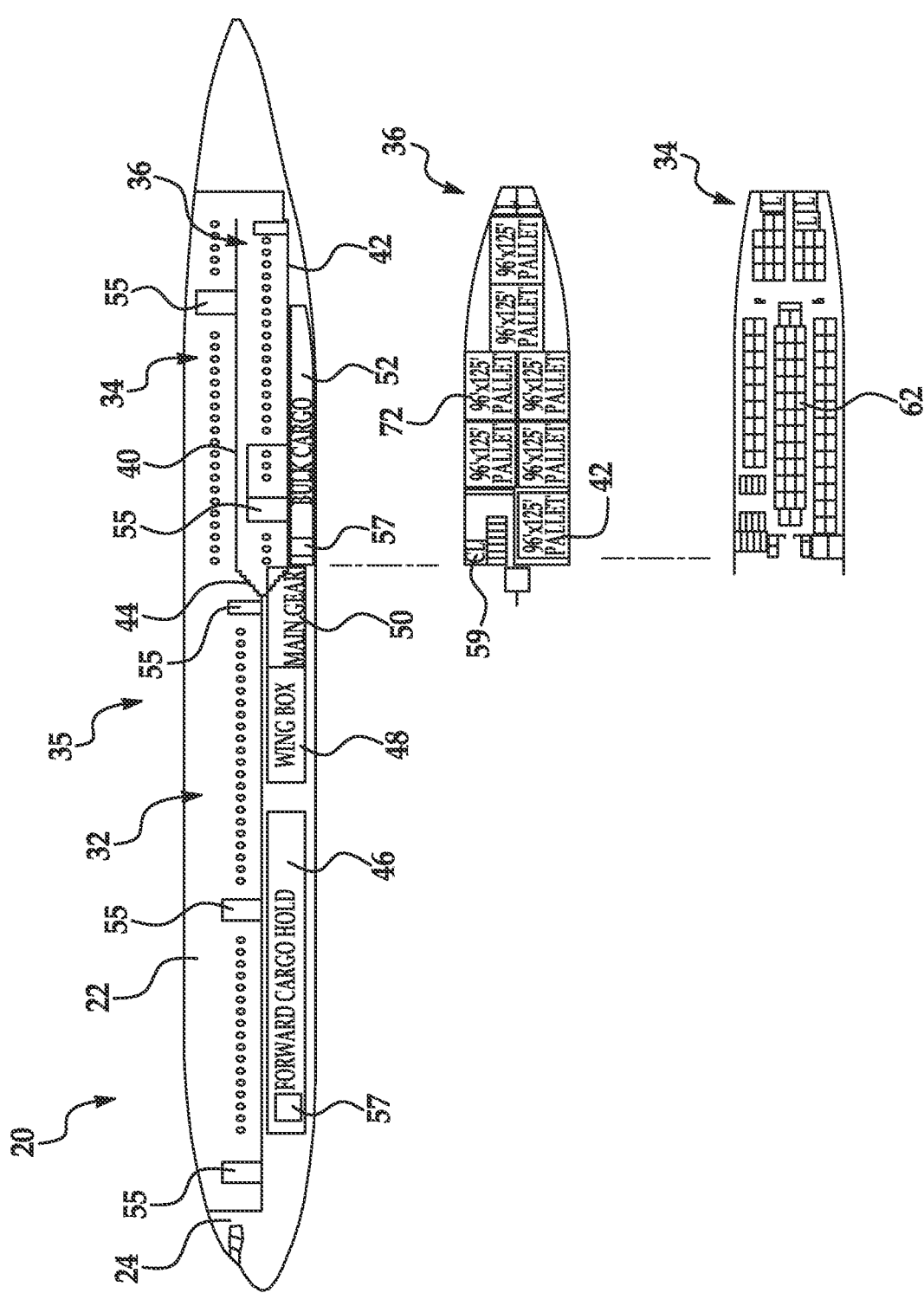
FIG. 8 is an illustration similar to FIG. 2 showing alternate layouts for the upper and lower cabins wherein the lower cabin is employed for cargo.

FIG. 8 illustrates another fuselage layout employing a split level cabin 35, but wherein the lower aft cabin 36 is adapted to carry either passengers or cargo. In this particular example, the lower cabin floor 42 has been adapted to support cargo pallets 72, however floor 42 may be readily adapted to have passenger seats mounted thereon. This flexible configuration allows airline customers to change their mix of passenger and cargo payloads on different routes and missions.

Figure 9:
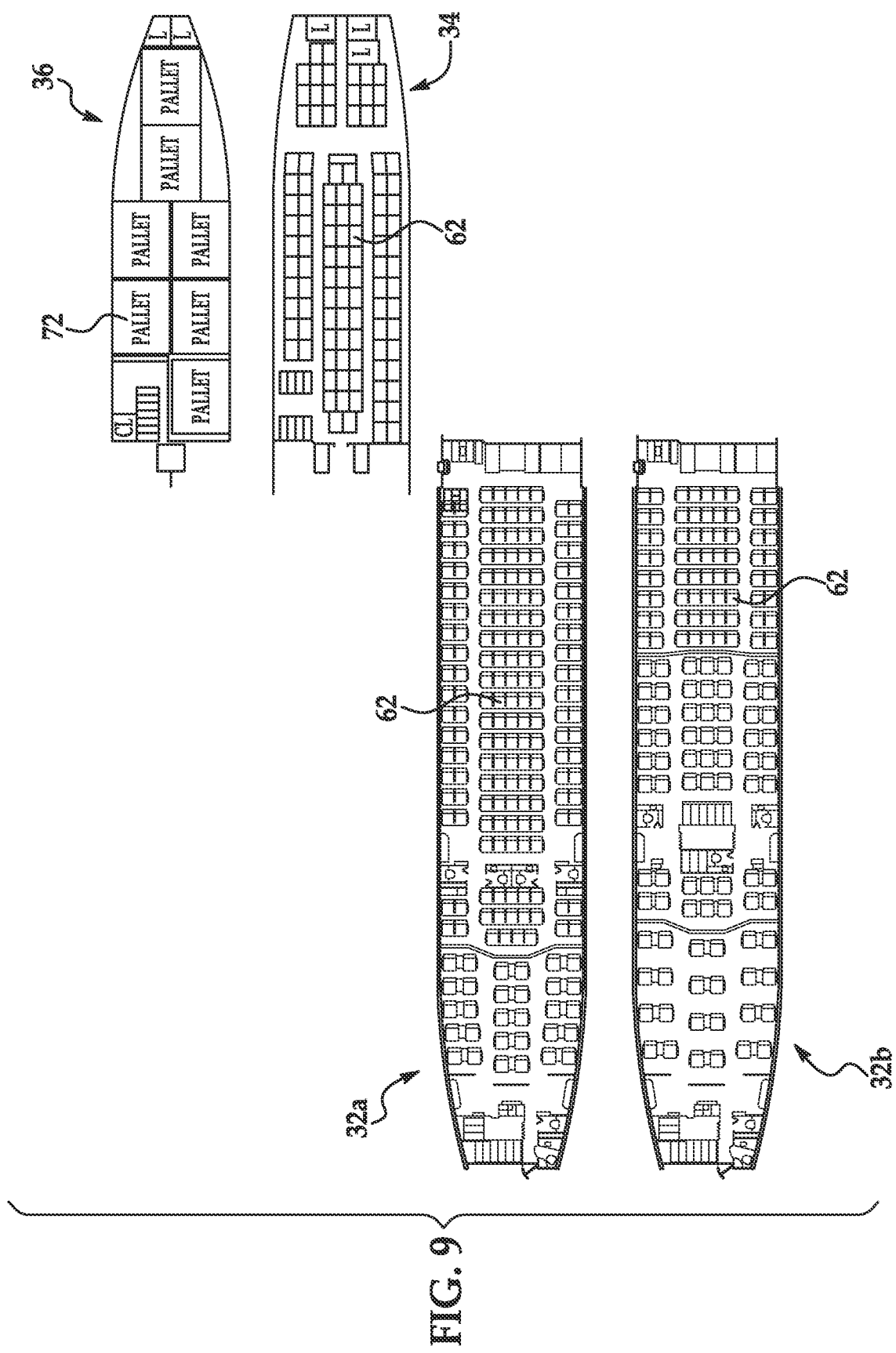
FIG. 9 is an illustration of a plan view of alternate cabin layouts for the aircraft shown in FIG. 8.

FIG. 9 illustrates another embodiment of the layout for the split level cabin where the main level cabin may be provided with a dual class seating arrangement 32a or a tri-class arrangement 32b. In this example, the lower aft deck 36 is adapted for carrying cargo pallets 72, with seven pallets shown but optionally convertible to varying mixes of cargo pallets and passenger seats, separated by an appropriate cargo barrier (not shown).

Figure 10:
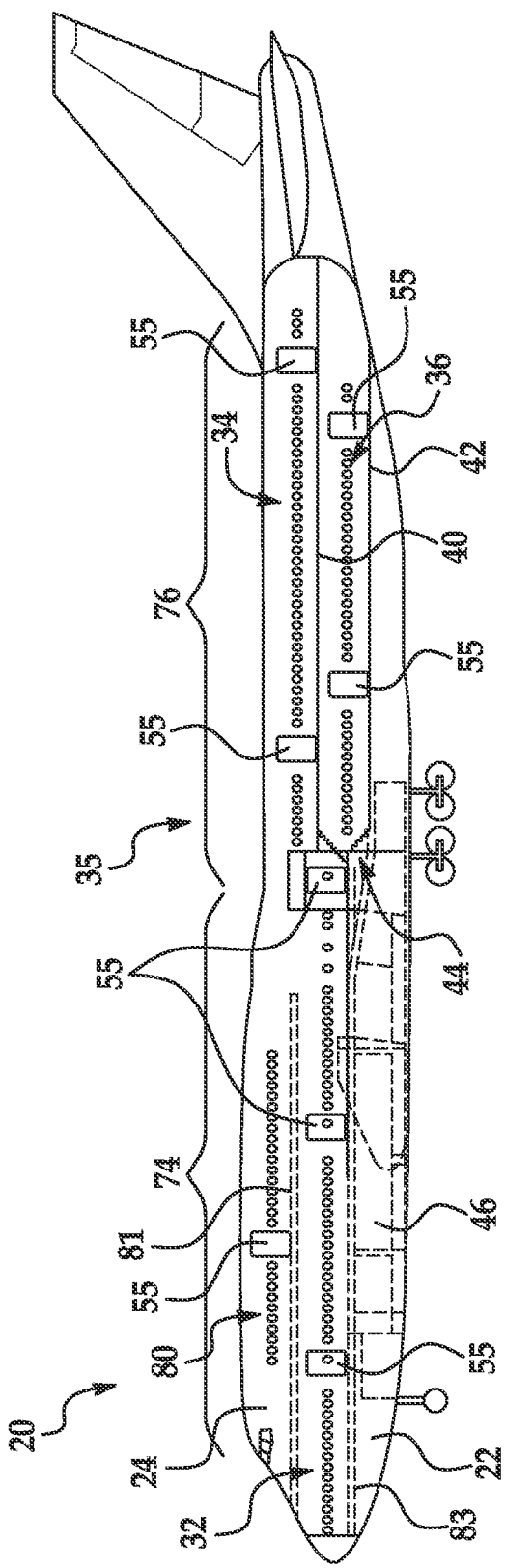
FIG. 10 is an illustration of a side view of a "jumbo" aircraft having the split level cabin of the disclosed embodiments.
Figure 10A:
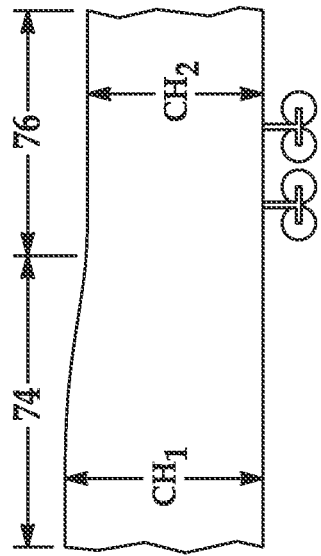
FIG. 10A is an illustration of a side view of a portion of the aircraft depicted in FIG. 10, showing difference in crown height between the fore and aft sections of the fuselage.

FIG. 10 illustrates a so-called "wide body" or "jumbo jet" 20 having a fuselage 22 provided with a double lobe forward section 74 and an aft section 76 that has a reduced cross sectional area shape. The forward section 74 may have a substantially constant cross section along its length and has a crown height $CH_1$ as shown in FIG. 10A. The aft section 76 also may have a substantially uniform cross section along its length and has a crown height $CH_2$ which is less than the crown height $CH_1$. The forward section 74 of the fuselage 72 includes a fourth cabin comprising a forward, upper level cabin 80 positioned aft of the cockpit 24, above a first forward main cabin 32. The forward, upper level cabin 80 has a floor 81, and the forward main cabin 32 has a floor 83. Floors 81, 83 may be connected by a set of stairs (not shown) typically located at the forward end of cabins 32, 80 to allow passengers and/or crews to traverse between these cabins.

The aircraft 20 further includes a split level cabin 35 formed by upper and lower aft stacked cabins 34, 36 in combination with the main forward cabin 32. The upper and lower stacked cabins 34, 36 are located aft of the main forward cabin 32, substantially within the aft section 76 of the fuselage 22 and may include a reduced height aft cargo deck 52 beneath the lower aft cabin 36 which is longitudinally spaced from a forward cargo deck 46 located beneath the main forward cabin 32. In this embodiment, the floor 40 of the upper aft cabin 34 is located above the main forward cabin floor 83, but below the level of the upper forward cabin floor 81. As in previous embodiments, the main forward cabin 32 is connected to the upper and lower aft cabins 34, 36 by a set of stairs 44.

Figure 11:
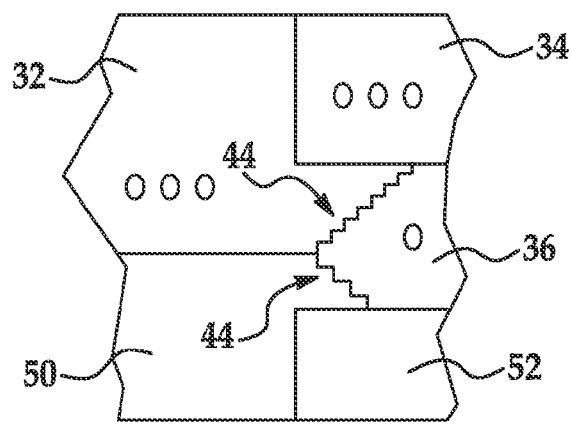
FIG. 11 is an illustration of a diagrammatic side view showing one stair layout for connecting the main cabin with the upper and lower cabins.
Figure 12:
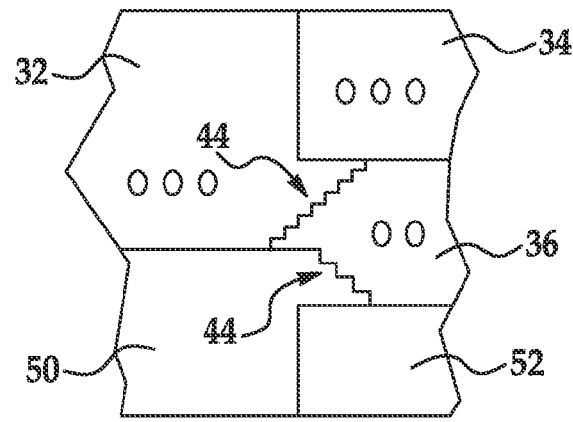
FIG. 12 is an illustration similar to FIG. 11 but showing an alternate stair layout.

FIG. 11 illustrates, on a larger scale, an arrangement of stairs 44 similar to that shown in FIG. 2 in which the two flights of stairs 44 connecting the main cabin 32 with the aft upper and lower cabins 34, 36 are substantially aligned in the longitudinal direction of the aircraft 20. FIG. 12 illustrates a stair layout in which flights of stairs 44 are longitudinally spaced or staggered from each other in order to accommodate varying cabin arrangements, similar to the embodiment shown in FIG. 7.

Figure 13:
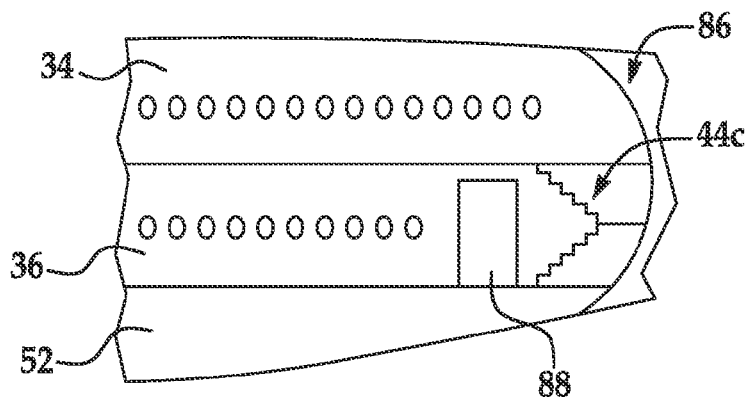
FIG. 13 is an illustration of a diagrammatic, side view of a rear portion of an aircraft that includes a second set of stairs directly connecting the upper and lower cabins.

FIG. 13 illustrates, on a larger scale, the aft flights of stairs 44c adjacent the aft bulkhead 86, which connect the aft upper and lower cabins 34, 36 shown in the embodiments of FIGS. 6 and 7.

Figure 14:
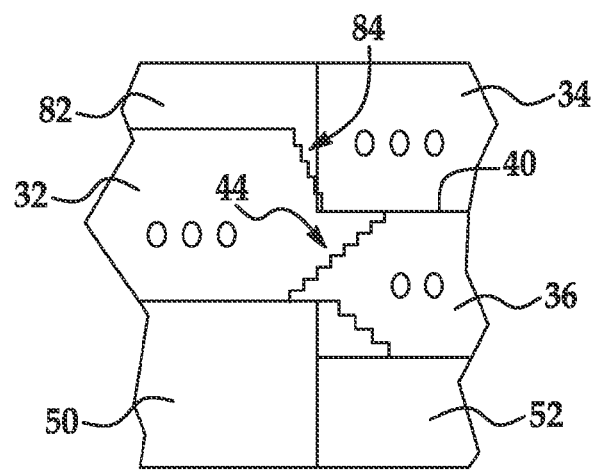
FIG. 14 is an illustration of a diagrammatic view of a fuselage layout that includes a compartment above the main cabin that is accessible from the upper cabin.

FIGS. 14 and 15 illustrate another embodiment of a split level cabin configuration comprising a main forward cabin 32, and upper and lower aft cabins 34, 36 that are connected by stairs 44. In this example, however, an upper compartment 82 is provided above the main cabin 44 which may be used for any of various purposes, such as a rest area for crew use. The upper compartment 82 may be accessed from the upper aft cabin 34 by a set of stairs or ladder 84 which extend between the upper cabin floor 40 and compartment 82. Positioning the crew rest area compartment 82 above the main cabin 32 eliminates the need for a comparable rest area on the main cabin floor 38, thereby freeing up additional space that may be employed for passenger seating. Alternate egress means (not shown) connecting the upper compartment 82 with the main cabin 44 may optionally be provided, for emergency or normal use.

Referring now to FIGS. 16A-16C, as previously mentioned, an elevator or similar transport means 90 may be provided in the aircraft 20 in order to transport passengers, cargo, galley carts, wheelchairs and the like between the cabin floors 38, 40, 42. As shown in FIG. 15A, the elevator 90 is positioned at the level of the upper cabin floor 40, allowing loading/unloading as shown by the arrow 92. In FIG. 16B, the elevator 90 is shown as having descended to the level of the main cabin floor 38 thus transporting passengers, etc. from the upper aft cabin 34 to the main cabin 32. FIG. 15C shows the elevator 90 having descended further to the level of the lower aft cabin floor 42. Alternate elevator or cart lift devices may be configured with two doors (as illustrated) or a single door.

Figure 17:
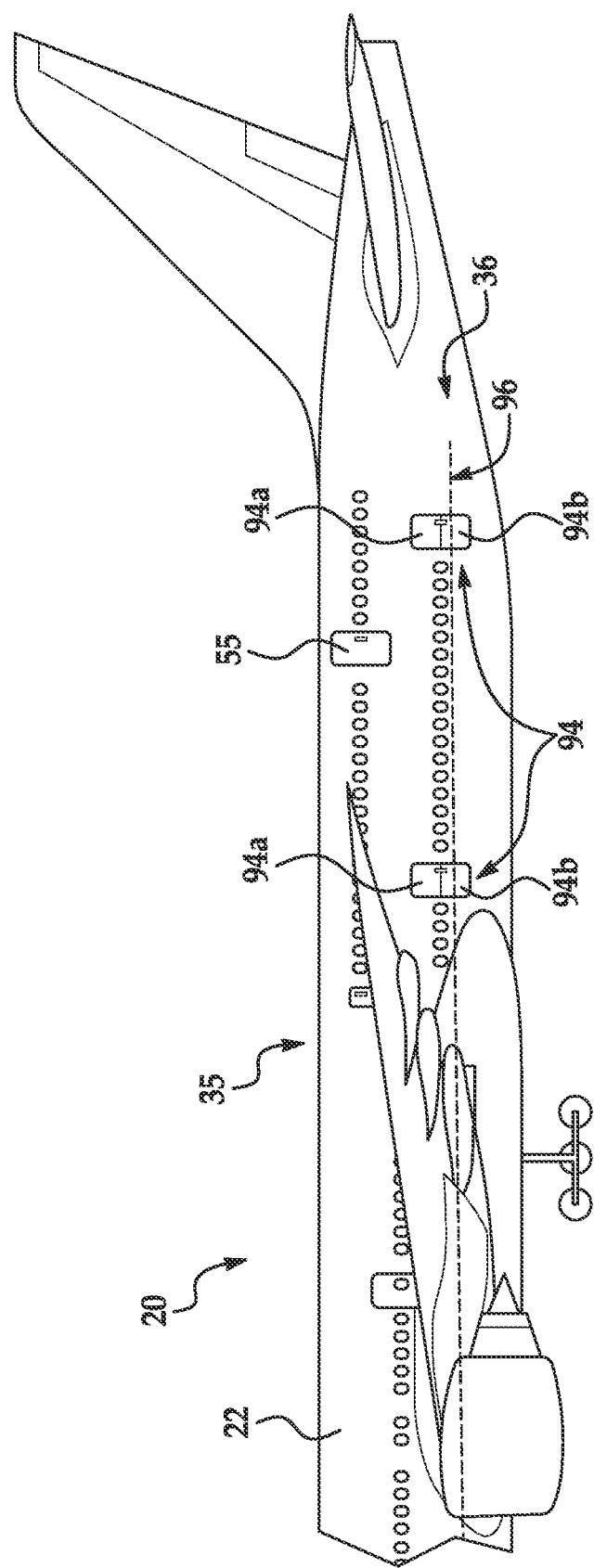
FIG. 17 is an illustration of a side view of the rear portion of an aircraft having split level cabins, showing the waterline of the aircraft and the use of horizontally divided doors in the lower cabin.

Attention is now directed to FIG. 17 which illustrates a rear portion of an aircraft 20 having a split level cabin 35 according to the disclosed embodiments. In this example, the aircraft 20 has an imaginary waterline 96 which represents the water level on the aircraft 20 in the event it must ditch in a body of water, where the aircraft 20 would float for a period of time. The lower aft cabin 36 may be partially located below the waterline 96. In order to allow emergency egress of passengers, horizontally split doors 94 are provided in the fuselage 22 at the level of the lower cabin 36. Each of the doors 94 includes upper and lower portions 94a, 94b which may be swung open independently of each other. Both portions 94a, 94b may be opened for normal land use. However, when evacuating in water, only the upper portion 94a is opened to allow passengers to climb over the upper sill of the lower portion 94b of the door 94 to evacuate the aircraft 20 onto a raft or slide raft (not shown). The lower door portion 94b which, because it is partially below the waterline 96, remains closed to prevent inflow of water while passengers may exit from the cabin 36 while the upper door portion 94a is open. If slide rafts are used during an evacuation, they may also be deployed over the upper sill of the lower portion 94b. The split doors 94, sometimes referred to as "dutch doors", may be employed with any of the embodiments previously described.

Shown in FIGS. 18-30 are illustrations of various embodiments of an alternative aircraft 100 having a fuselage 102 with an aft portion 104 having a split level double deck. In various configurations, this embodiment helps to optimize use of the fuselage volume while also satisfying the desires for crash worthiness and cargo carrying. The split level aft double deck layout employs a fuselage 102 of non-uniform cross-section, having a lowered aft keel 106. This configuration reduces cargo carrying capacity and increases passenger capacity, while keeping maximum takeoff weight and aircraft flight characteristics substantially unchanged relative to the comparable base aircraft. As with the other embodiments disclosed herein, cargo decks beneath passenger seating areas provide crushable zones that absorb energy during crash landings in order to protect passengers.

Figure 18:
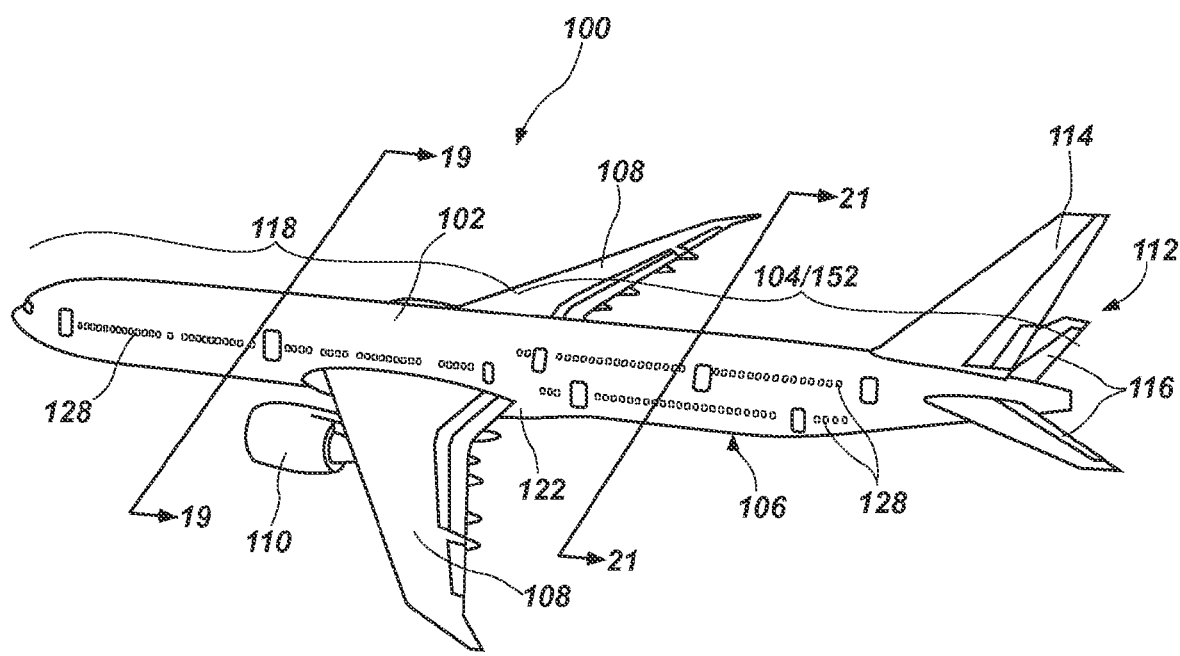
FIG. 18 is a pictorial illustration of an embodiment of an airliner with a split level aft double deck in accordance with the present disclosure.

Shown in FIG. 18 is a perspective view of an embodiment of an airliner 100 with a split level aft double deck 104 in accordance with the present disclosure. Like conventional aircraft generally, this aircraft includes a generally cylindrical fuselage 102 having a main wing assembly 108 located approximately midway along the fuselage 102 with jet engines 110 attached to pods below the main wings 108 for providing propulsion, and a tail assembly 112 that includes a rudder 114 and elevators 116 for aircraft control. The fuselage 102 of the aircraft 100 includes a forward portion 118 with a single level forward passenger cabin 120, as discussed below. Unlike conventional aircraft, however, this aircraft 100 includes an aft fuselage section 104 having a split level double deck passenger cabin configuration. The double deck portion begins near the aft region of the main wing 108 and of the wing-to-body/landing gear fairing 122, and includes an upper aft cabin 124 that is above the level of the forward cabin 120, and a lower aft cabin 126 that is below the level of the forward cabin 120. The forward cabin 120 and the upper and lower aft cabins 124, 126 each include aircraft windows and doors for ordinary and/or emergency ingress and egress. Doors associated with the forward cabin 120 of the aircraft are designated 130, while the doors of the upper aft cabin 124 are designated 130a and the doors of the lower aft cabin 126 are designated 130b.

Figure 19:
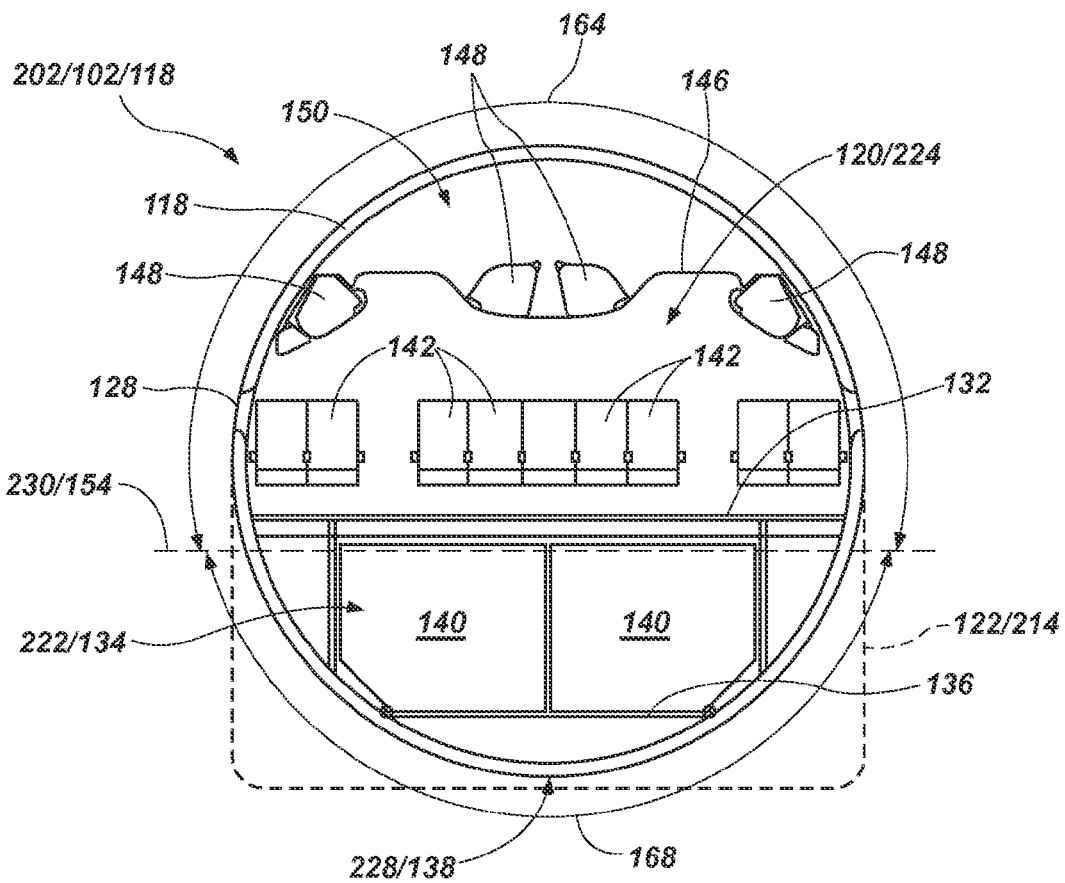
FIG. 19 is a cross-sectional view of the fuselage of a conventional single deck, wide body base aircraft.

FIG. 19 is a cross-sectional view of the forward portion 118 of the aircraft 100 shown in FIG. 18. This cross-sectional view also represents the fore and aft portions of the fuselage of a conventional single deck, wide body base aircraft 200, shown in FIG. 20, which is the basis or starting point of the split level aft double deck aircraft 100. The fuselage 102 of the forward portion 118 has a generally cylindrical shape and includes a forward passenger cabin 120 with a floor or deck 132 and a forward cargo hold 134 having a forward cargo deck 136, located below at least a portion of the floor 132 of the forward passenger cabin 120, and above the keel 138 of the forward fuselage portion 118. The forward cargo deck 136 can be configured for accommodating standardized cargo containers 140, as shown, or cargo can be placed in the cargo hold on pallets, in bulk, or in other ways.

Figure 20:
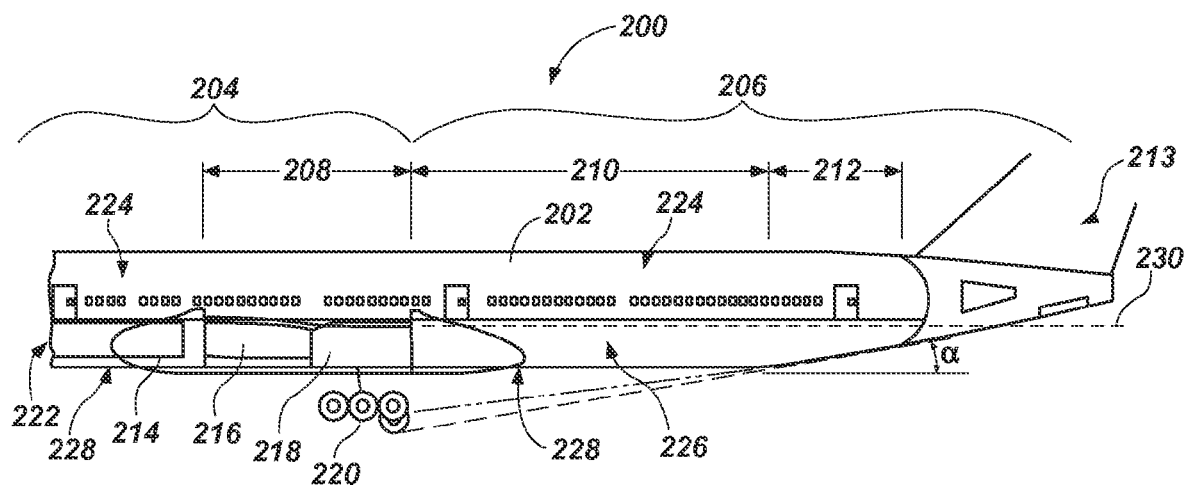
FIG. 20 is a diagrammatic side view of the base aircraft of FIG. 19.

Shown in FIG. 20 is a partial center line diagram of a base aircraft 200 having a conventional single deck fuselage 202. This figure also helps to illustrate some of the changes that relate to the aft fuselage 104 of the split level aft double deck aircraft 100 according to the present disclosure. The fuselage 202 of the base aircraft 200 generally includes a forward portion 204 and an aft portion 206. The forward portion 204 can be defined to include the overwing section 208. The aft portion 206 can be further divided into an aft constant section 210, an aft tapered section 212 and a tail assembly 213. The aft constant section 210 has the general cross-sectional configuration shown in FIG. 19. The overwing section 208 has a shape that is modified from that of FIG. 19 by the wing-to-body/landing gear fairing 214, which contains the wing box structure 216 and main landing gear well 218 for containing the main landing gear 220, but is otherwise the same as shown in FIG. 19. The tail assembly 213 can be an unpressurized tail cone section. Commercial aircraft typically include an unpressurized tail cone section that is attached to the rear extremity of the pressurized fuselage and can include mechanical and electrical devices, such as actuators and the like for controlling the rudder and elevators of the aircraft. This tail cone section is designed with a geometric shape that matches the taper angles of the rear of the aircraft fuselage, as discussed below. That is, the unpressurized tail cone section 213 is attached to the aftmost portion of the aft fuselage 206, and has a lower surface that defines a continuation of the upswept undersurface of the aftmost portion of the fuselage.

The forward portion 204 of the fuselage 202 includes a forward cargo hold 222 below a forward portion of the main cabin 224 (which corresponds to the forward passenger cabin 120 of FIG. 19), and the aft portion 206 of the fuselage 202 includes an aft cargo hold 226 below an aft portion of the main cabin 224. Both of these cargo holds 222, 226 are disposed above the keel 228 of the aircraft (i.e. the lowest point along the belly of the aircraft), which is at a substantially constant elevation along the length of the aircraft 200, except in the aft tapered section 212, where the keel 228 tapers upward at an angle α. This taper angle of the aft keel 228 allows for takeoff roll and landing flare of the aircraft 200 while protecting the tail assembly 213 from striking the runway. The tapered keel line 228 causes the aft cargo hold 226 to taper to a smaller size toward the rear of the fuselage 202. The waterline 230 of the aircraft 200 is also shown in FIG. 20. As noted above, the waterline can represent the intended floating level of the aircraft 200 in a water ditching condition. This can be referred to as the ditching waterline. At the same time, the term "waterline" is also used in the aircraft industry to refer to any horizontal plane or datum with respect to the aircraft fuselage, and can be located at various levels with respect to the aircraft, not necessarily the ditching waterline, which is the actual anticipated water level in a water ditching condition.

Referring again to the cross-sectional view of FIG. 19, which applies to the forward portion 118 of the fuselage 102 of the aircraft 100 in FIG. 18 and to the forward and aft portions 204, 206 of FIG. 20, the main passenger floor 132 supports passenger seats 142 and passengers 144, and the passenger cabin 120 includes a drop ceiling 146 that supports stowage bins 148 for carry-on luggage, etc. As can be seen in the view of FIG. 19, there is a substantial above-ceiling space 150 the fuselage above the passenger cabin ceiling 146 that is largely unused. In some wide body aircraft a portion of the above-ceiling space is used for a crew rest (shown and described below and in connection with FIG. 15) and storage purposes (e.g. storage of galley carts, etc.), but such uses typically do not consume all of this above-ceiling space, particularly in the aft portion of the aircraft.

Advantageously, the derivative aircraft 100 disclosed herein, one embodiment of which is shown in FIG. 18, uses the otherwise unused above-ceiling space 150 in the aft portion 104 of the aircraft fuselage 102 to provide an aft double deck passenger cabin configuration without substantially increasing maximum takeoff weight or wing loading. As described above, the aircraft 100 includes a fuselage 102 having a first passenger cabin 120 with a first floor 132, located in a forward portion 118 of the fuselage 102, with a first cargo deck 134 located below at least a portion of the first passenger cabin 120, as illustrated in FIG. 19. Advantageously, this aircraft 100 includes a split level double deck cabin, indicated generally at 152 in the aft portion 104 of the fuselage 102.

Figure 21:
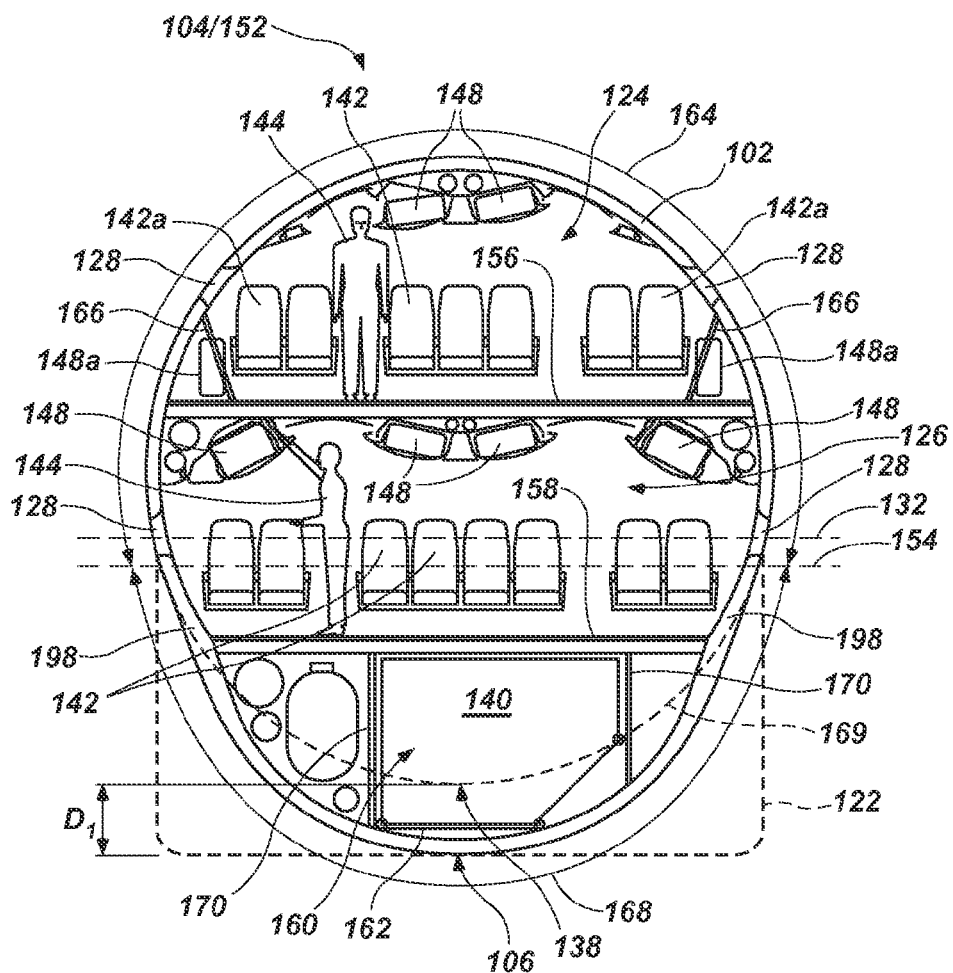
FIG. 21 is a cross-sectional view of one embodiment of a split level aft double deck portion of an aircraft fuselage.
Figure 22:
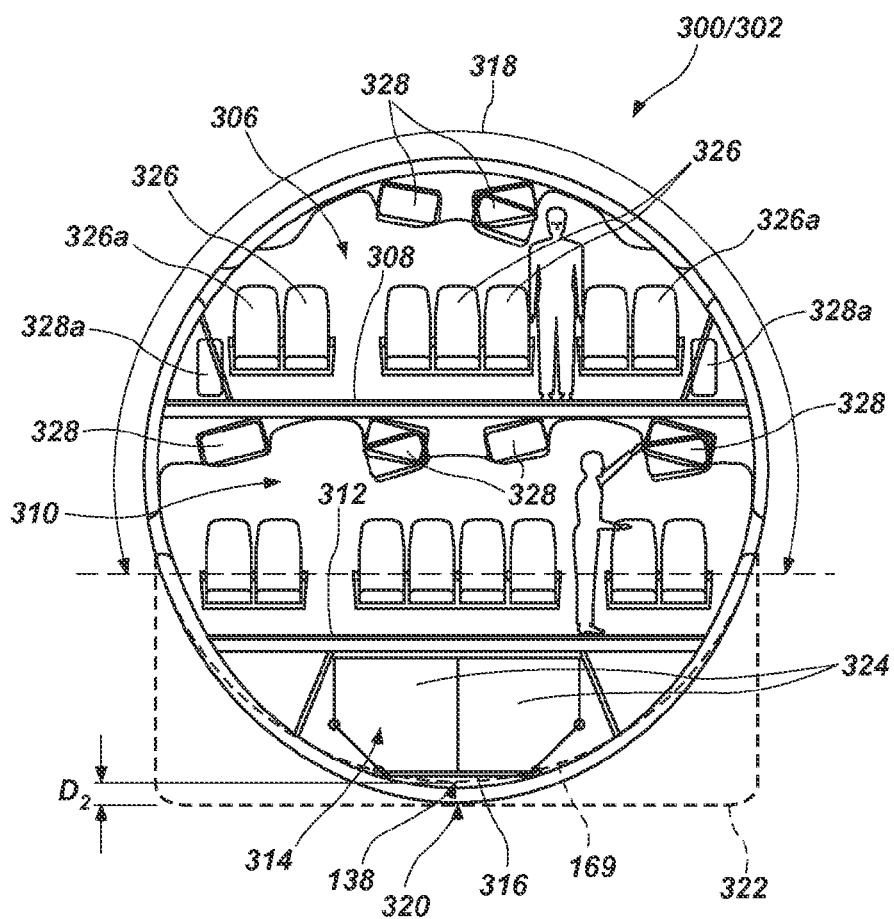
FIG. 22 is a cross-sectional view of another embodiment of a split level aft double deck portion of an aircraft fuselage, this configuration having a smaller lowering of the aft keel line, configured to accommodate different size cargo containers.
Figure 23:
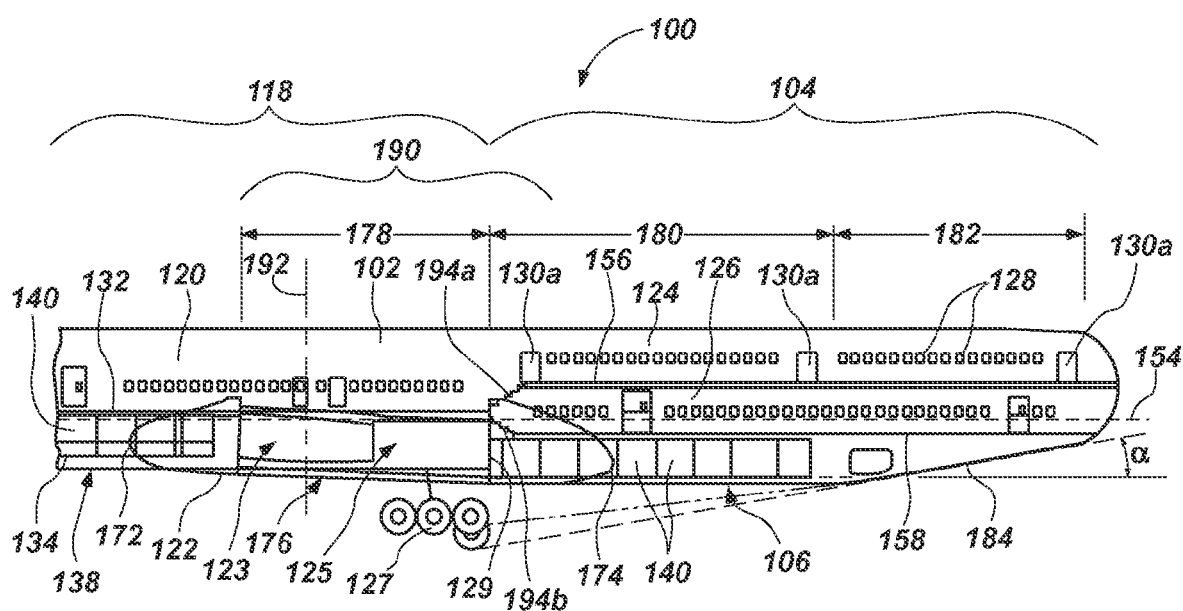
FIG. 23 is a diagrammatic side view of the fuselage of an aircraft having a split level aft double deck, showing changes which may apply to the aft body according to the present disclosure.
Figure 24:
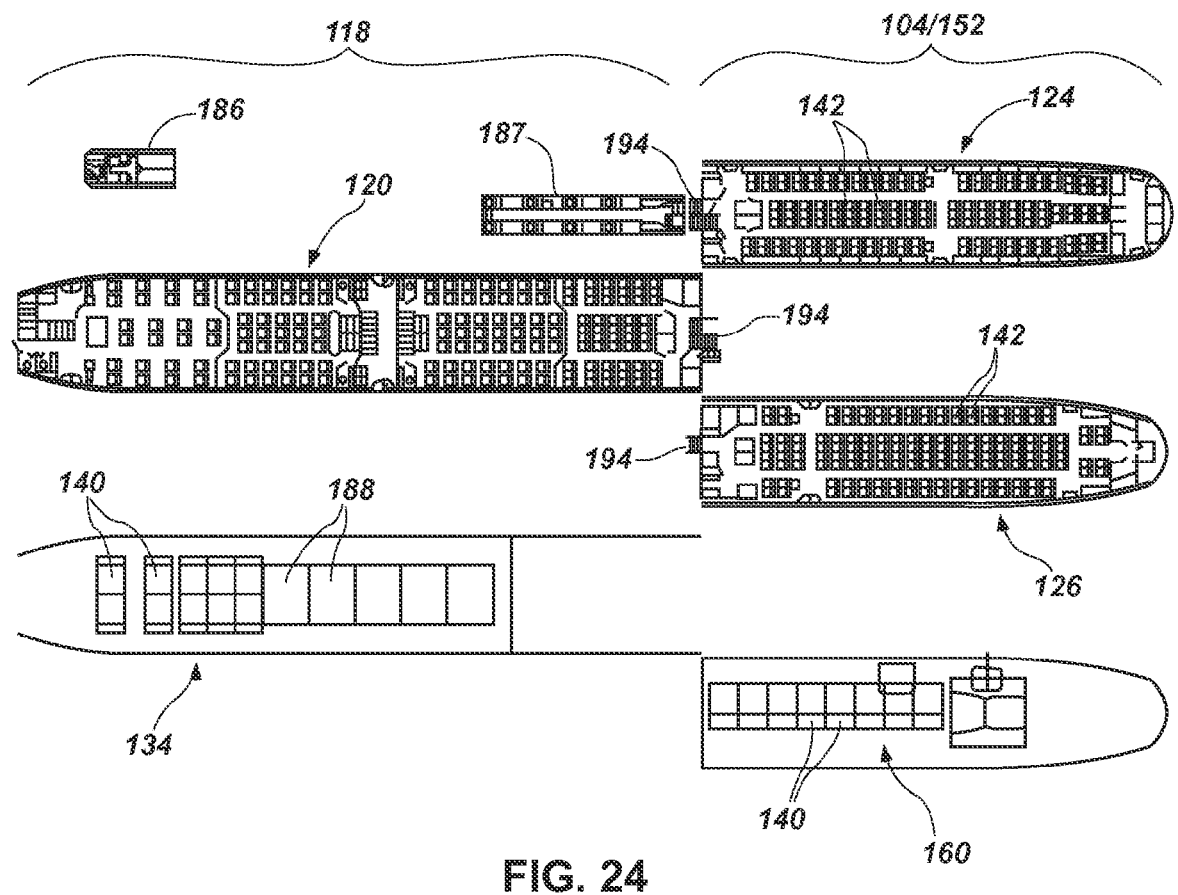
FIG. 24 is a plan view diagram showing one embodiment of a passenger and cargo payload configuration for an aircraft having a split level aft double deck in accordance with the present disclosure.

The aft fuselage 104 of the derivative aircraft 100 is substantially new, and has a split level double-deck configuration, with an upper aft cabin 124 and a lower aft cabin 126. Shown in FIG. 21 is a cross-sectional view of one embodiment of an aft double deck portion 152 of an aircraft aft fuselage 104 in accordance with the present disclosure. Shown in FIG. 23 is a partial center line diagram of the fuselage 102 of this aircraft 100, and a plan view diagram showing one exemplary passenger and cargo payload configuration for this aircraft is shown in FIG. 24. This aircraft configuration is called a split level aft double deck because neither of its two aft cabins 124, 126, which are positioned one above the other, are at the same elevation as the forward passenger cabin 120. This configuration provides greater passenger capacity with an offsetting reduction in cargo capacity, which is believed to be acceptable and even desirable for many commercial aircraft routes. At the same time, the configuration of the deepened cross-section shown in FIGS. 18-30 provides greater cargo capacity for an aft double deck aircraft than the other aft double deck configurations disclosed herein.

The aft double deck section 152 can be configured in various ways. The level of the floor of the main cabin 132, also called the first floor, and the aircraft waterline 154, are shown in dashed lines in FIG. 21. The waterline 154 of the split level aft double deck aircraft 100 is shown at substantially the same elevation relative to the forward fuselage portion 118 as the waterline 230 of the base aircraft 200. The aft fuselage section 104 shown in FIG. 21 includes the upper second cabin 124 having a second floor or deck 156 above the level of the first floor 132, and the lower third cabin 126 beneath the upper second cabin 124 and having a third floor or deck 158 below the level of the first floor 132. A second aft cargo hold 160 having a cargo deck or floor 162 is located in the aft portion 104 of the fuselage 102 and beneath at least a portion of the lower third cabin 126.

The second and third cabins 124, 126 each include passenger seats 142 and stowage bins 148 for carry-on luggage. Passengers 144 are shown for size reference. In this embodiment the second upper cabin 124 includes passenger seats 142 that are seven-abreast, while the lower third cabin is configured to seat passengers eight-abreast. The outer stowage bins 148a for the second upper cabin 124 can be placed approximately at the level of the floor 156 near the window seats 142a in each passenger aisle. This configuration is partly the result of the inward curvature of the crown portion or crown section 164 of the aft fuselage 104 in the upper cabin 124, and also partly the result of additional diagonal stanchions 166 that are provided at the outboard region of the upper deck 156. The inward curve of the crown section 164 of the aft fuselage 104 largely eliminates any space for overhead storage bins on the outboard side of the aircraft in the upper cabin 124, and also limits the proximity of the outboard seats 142a to the fuselage 104 because of headroom constraints. At the same time, the location and geometry of the diagonal stanchions 166 also limits the proximity of the outboard seats to the fuselage 104 of the aircraft 100. These two factors work together to reduce or eliminate one potential location for on-board stowage bins, while creating some otherwise unused space that can be used for the outboard floor level stowage bins 148a.

The extent of changes to the aft fuselage 104 outside mold line are shown in FIG. 21. The term "mold line" has reference to the outer cross-sectional profile of the fuselage, and can be divided into an upper mold line representing the cross-sectional profile of the crown section 164—that is, the fuselage above the waterline 154—and a lower mold line 168, representing the aircraft cross-sectional profile below the waterline 154. The location of the waterline, and thus of the transition between the crown section 164 and the modified profile lower portion 168 can vary. In some embodiments, the elevation of the waterline 154 that differentiates between the lower modified fuselage section 168 and the unmodified crown section 164 can be at the point of maximum width of the fuselage 104. In other embodiments, the elevation of the waterline 154 can be at the top of the wing-to body fairing 122. Other vertical positions for the waterline can also be used.

The lowest point along the lower mold line 168 of the aircraft 100 is the lowered keel 106. The crown section 164 has a substantially constant cross-sectional shape (e.g. generally semi-circular) fore-to-aft above both the forward or first passenger cabin 120, and above the split level cabin 152. However, as can be seen in FIG. 21 the lower outside mold line 168 is modified compared to the base aircraft 200. Specifically, the keel 106 of this aircraft 100 below the second or aft cargo deck 162 is lowered compared to the keel 138 below the first or forward cargo deck 136. The extent of this lowering is indicated by dimension $D_1$, shown in FIG. 21. The elevation of the keel 138 of the forward portion 118 of the fuselage 102 is shown in a dashed line in FIG. 21, as is the outline of the lower mold line 169 of the base aircraft.

The lowered keel 106 of the aft portion 104 of the aircraft 100 allows a larger aft cargo hold 160, even with the lowered third deck 158. For this reason, the aft cargo hold 160 can be configured for accommodating standardized cargo containers 140, as shown, and not be limited to bulk cargo. For example, the second cargo hold 160 can be configured to accommodate cargo containers 140 such as LD-1, LD-2, LD-3, LD-3-46, LD-3-46W, LD-3-45, and LD-3-45W containers. Other cargo containers, cargo pallets, and bulk cargo can also be stowed in the second cargo deck.

As shown in FIG. 24, the aft cargo deck 160 in this embodiment is configured to accommodate one row of standardized cargo containers 140, compared to two rows of the same types of containers in the forward cargo hold 134, as also illustrated in the cross-sectional view of FIG. 19. The second cargo deck 160 includes first and second stanchions 170a, b, supporting the lower third floor 158 on opposing sides of the aft fuselage 104. This cargo hold 160 accommodates the cargo containers 140 between the first and second stanchions, and space outboard of the first and second stanchions 170, outside of the cargo bay 160, can contain electrical and mechanical equipment for example.

The forward fuselage 118 is substantially the same as the parent or base airplane 200. The aft fuselage 104 has a crown section 164 that is continuous with the forward fuselage 118, but the keel 106 is lowered, or in other words, the lower mold line 168 of the aircraft belly is deepened. This lowered keel provides several benefits. For example, it allows the aft fuselage 104 to carry standardized cargo containers 140 (e.g. LD-1 or LD-3 containers, as shown in FIG. 21), and gives the aircraft improved ditching evacuation capability. This lowered keel configuration also gives the aircraft improved crashworthiness by providing a crush zone beneath the aft fuselage section 104, and by reducing cargo capacity to offset the increased passenger capacity, the modified aircraft can have reduced fuselage weight, so that it can react to horizontal tail up or down pitching moment loads comparably to the base aircraft 200.

As is common with large aircraft, the fuselage 102 includes an aerodynamic fairing 122 in the region of attachment of the main wing assembly 108. The aerodynamic fairing 122 can be a wing-to-body fairing, or a main landing gear fairing, or a combined wing-to-body and main landing gear fairing. As is apparent from the view of FIG. 23, the aerodynamic fairing 122 encloses the portion of the aircraft 100 that includes the wing box 123 and the main landing gear well 125 for receiving the main landing gear 127 when retracted during flight. Other structure can also be associated with or contained within the fairing 122, such as aircraft air conditioning equipment (not shown). At the rear extremity of the main landing gear well 125 is an aft landing gear well bulkhead 129, which provides a vertical structural wall in the aircraft, and also provides a pressure bulkhead between the lower aft cabin 126 and the aft cargo hold 160, which are pressurized, and the landing gear well 125, which is not pressurized.

In the aircraft 100 with the split level aft double deck 152, the fairing 122 is modified and transitions between the standard elevation keel 138 of the forward portion 118 of the fuselage 102, and the lowered keel 106 of the aft portion 104 of the fuselage 102. That is, the leading edge 172 of the fairing 122 is flush with the forward keel 138 of the aircraft, while the trailing edge 174 of the fairing is flush with the lowered aft keel 106 of the aircraft 100. Thus the substantially flat and typically horizontal bottom surface 176 of the fairing 122 in this aircraft is still generally flat, but is not horizontal. Instead, the bottom surface 176 of the aircraft fairing 122 slopes downward toward the rear of the aircraft 100, defining an elevational transition between the keel line 138 of the forward fuselage portion 118 and the lowered keel 106 of the aft fuselage portion 104.

The passenger deck configuration and cargo hold size and shape can vary in split level aft double deck aircraft configured according to this disclosure. Shown in FIG. 22 is a cross-sectional view of another embodiment of a split level aft double deck 302 of an aircraft 300. Though not shown in the view of FIG. 22, like the other embodiments described above, the fuselage of the aircraft 300 can include a forward portion with a main cabin and a first or main deck, and a forward cargo hold beneath at least a portion of the main deck. The aft fuselage 304 of the aircraft includes an upper second cabin 306 having a second floor 308 above the level of the first floor, and a lower third cabin 310 beneath the upper second cabin 306 and having a third floor 312 below the level of the first floor. A second, aft cargo hold 314 having a floor or deck 316 is located in the aft fuselage 304 and beneath at least a portion of the lower third cabin 310.

The aft fuselage 304 has a crown section 318 and a lowered keel 320. This configuration provides a smaller lowering of the aft keel line 320 and of the aerodynamic fairing 322 compared to the configuration of FIG. 21. The base aircraft keel 138 and base aircraft lower outside mold line 169 are shown in FIG. 22, showing the difference in depth $D_2$ of the lowered keel 320 relative to the keel 138 of the base aircraft. With a smaller lowering of the aft keel 320, one feature of this configuration is that the aft cargo hold 314 is configured to accommodate LD3-45 or LD3-45W cargo containers 324 instead of the LD1 or LD3 containers 140 that can be accommodated in the embodiment of FIG. 21. It is to be appreciated that the different magnitudes of keel lowering shown in FIGS. 21 and 22 and elsewhere herein are only exemplary. Many different configurations of a lowered aft keel line aircraft can be made in accordance with the present disclosure.

As with the embodiment of FIG. 21, the second and third cabins 306, 310 of the embodiment of FIG. 22 each include passenger seats 326 and overhead stowage bins 328 for carry-on luggage, with the second upper cabin 306 having passenger seats 326 that are seven-abreast, while the lower third cabin is configured to seat passengers eight-abreast. The outboard passenger seats 326a and outboard stowage bins 328a for the second upper cabin 306 are configured and located similar to those shown and described with respect to FIG. 21.

Whether the double deck cabin configuration is like that shown in FIG. 21 or 22 or some other configuration, the geometric configuration of the split level aft double deck aircraft disclosed herein preserves the aft taper angle of the base aircraft (200 in FIG. 20). These features are shown in FIG. 23, which provides a partial center line diagram of the fuselage 102 of an aircraft 100 having a split level aft double deck 152, showing the forward portion 118 and the aft portion 104. The forward portion 118 includes the overwing section 178. The aft portion 104 contains the split level double deck 152, and can be further divided into an aft constant section 180, an aft tapered section 212 and the tail assembly 112. The overwing section 178 generally includes the portion of the fuselage in the region of the wing-to-body fairing 122, which includes the wing box 123 and main landing gear wheel well 125. As discussed above, the keel 138 is at a first elevation along the forward fuselage portion 118, and transitions downward in the overwing section 178 to the lowered keel 106.

In the view of FIG. 23 it is apparent that the lowered keel 106 transitions to an upswept undersurface 184 having an upward taper at an angle $\alpha$ in the aft tapered section 182. As with the base aircraft (200 in FIG. 20), this upswept undersurface 184 is selected to enable adequate aft body tailstrike margins suitable for takeoff roll and landing flare of the aircraft 100. This aft taper angle $\alpha$ is substantially the same as the corresponding aft taper angle $\alpha$ of the base aircraft (200 in FIG. 20), and allows for takeoff roll and landing flare of the aircraft 100 while protecting the tail assembly 112 from striking the runway. The tapered keel line 106 also causes the aft cargo hold 160 to taper to a smaller size toward the rear of the aft fuselage 104.

This configuration of the aft tapered section 182 also allows the derivative aircraft 100 to use fuselage unpressurized sections that are the same as on the base aircraft. For example, using the same aft taper angle $\alpha$ allows the unpressurized tail cone assembly (213 in FIG. 20) of the base aircraft (200 in FIG. 20) to be used as the tail assembly 112 of the modified aircraft 100. By keeping these angles the same on the derivative aircraft 100 having an aft double deck 152, the same tail cone structure can be used on the derivative aircraft.

The aft fuselage 104 thus allows the closing angles for the derivative airplane 100 to be at least comparable to those of the base airplane. Consequently, all tangency angles at the aft end of the pressurized fuselage 102 of the derivative airplane 100 can be the same as on the base airplane (200 in FIGS. 19, 20), so that takeoff and landing geometric considerations (e.g. roll or flare angles, etc.) can remain substantially the same, as can landing gear geometry, etc. The length of the derivative airplane fuselage 102 can be substantially the same as the length of the base airplane (200 in FIG. 20). Alternatively, the length can vary from the base aircraft, if desired.

Also shown in dashed lines in FIG. 23 are the aircraft waterline 154 and forward keel line 138. The waterline 154 in this embodiment is at substantially the same elevation, relative to the forward keel 138, as the ditching waterline of the base aircraft (230 in FIG. 20). As noted above, the upper and lower decks 124, 126 each include aircraft windows 128 and doors 130 for ordinary and/or emergency ingress and egress. In one embodiment, the lower third cabin 126 includes at least one passenger egress door 130b having a ditching evacuation sill height at a level above the waterline 154 of the aircraft 100. In order to allow safe evacuation of the aircraft when floating in water, it is desirable that the emergency egress doors have a sill height that is above the ditching waterline. Where the ditching waterline 154 is above the elevation of a given aircraft deck, providing the at least one passenger egress door 130b having a ditching evacuation sill height at a level above the waterline 154 of the aircraft 100 can be done in various ways. In one approach, the doors 130b of the lower third deck 126 can be provided with an internal water dam adjacent to the lower portion of the door 130b, which allows the door to be opened in a water ditching condition without flooding the lower third deck 126. Such doors are known in the aircraft industry.

Alternatively, the passenger egress doors 130b on the lower third deck can be horizontally split doors that include an upper portion 131a and a lower portion 131b that may be swung open independently of each other, in the manner discussed above with respect to FIG. 17. Both portions 131a, 131b may be opened for normal land use, but when evacuating in water, only the upper portion 131a is opened to allow passengers to climb over the upper sill of the lower portion 131b to evacuate the aircraft onto a raft or slide raft (not shown). The upper sill of the lower door portion 131b thus provides a sill height that is above the waterline 154, allowing the upper portion of the door to be opened in a water ditching condition without the danger of flooding the lower third deck 126.

The view of FIG. 23 also illustrates the degree to which the modified or lowered keel line 106 differs from that of the base aircraft, and also shows the cargo containers 140 in the aft cargo hold 160. Shown in FIG. 24 is plan view diagram showing the passenger and cargo payload configuration for an aircraft having a split level aft double deck 152. This figure shows only one of many possible passenger and cargo configurations that can be used, this one being for a Boeing 777 type aircraft that has been modified to have a split level aft double deck 152. It will be apparent that other configurations can be devised for other aircraft, and different seating and cargo arrangements for this aircraft can also be devised.

As can be seen in FIG. 24, the forward portion 118 of the fuselage 102 includes a forward crew rest compartment 186, having two berths, which is located in a portion of the above-ceiling space (150 in FIG. 19) above a forward portion of the first passenger cabin 120, and an aft crew rest compartment 187 having eight berths, located in a portion of the above-ceiling space 150 above an aft portion of the first passenger cabin 120. The forward cargo deck 136 is shown containing both containerized cargo 140, and palletized cargo 188. The fuselage aft portion 104 includes the upper second cabin 124 and the lower third cabin 126, with the aft cargo hold 160 below the third deck. In the embodiment shown in FIG. 24 the split level aft double deck 152 is configured as shown in FIG. 21, with passenger seats 142 seven-abreast on the upper second deck 124, and eight-abreast in the lower third deck 126, both representing a typical "economy" class of seats. The forward portion 118 of the aircraft 100 is divided between economy class, business class, and first class seating. In this configuration, the aircraft has a total passenger capacity of 476 passengers, with 150 of the passenger seats 142 on the upper second deck 124, and 160 of the seats being on the lower third deck 126. This view also shows the single row of cargo containers 140 in the aft cargo hold 160.

Figure 25:
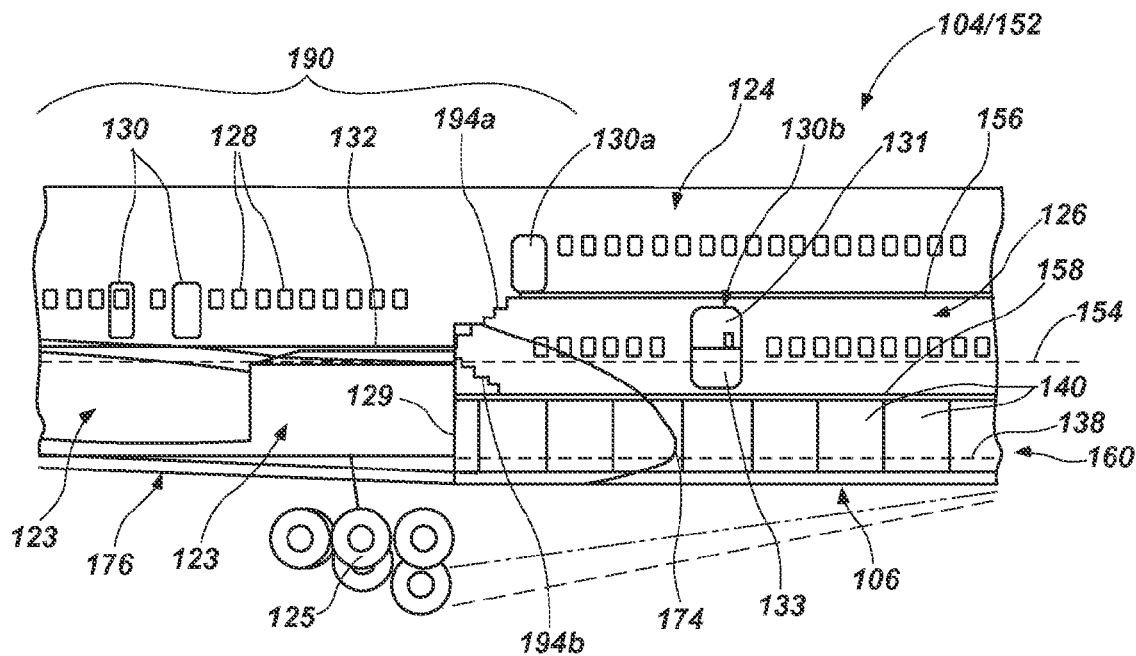
FIG. 25 is a close-up partial diagrammatic side view showing the aircraft body transition to the aft portion in more detail.
Figure 26:
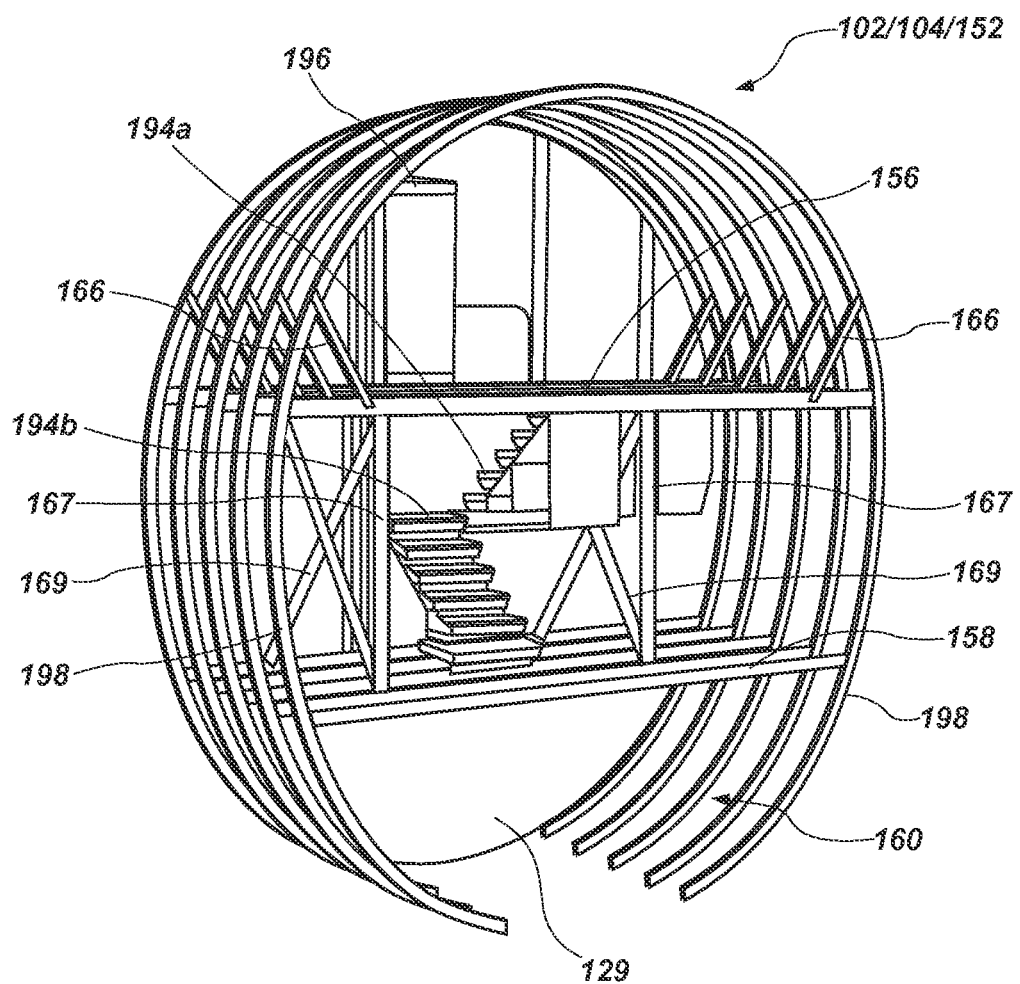
FIG. 26 is a perspective view of an embodiment of an aircraft fuselage structure in the transition region for an aircraft having a split level aft double deck.

A close-up partial center line diagram of this aircraft 100 showing a transition region 190 of the aircraft fuselage, in which the fuselage transitions from the single deck forward portion 118 to the aft portion 104 having a double deck 152 is provided in FIG. 25. A perspective view of a portion of an aircraft fuselage 102 in the transition region 190 is shown in FIG. 26. The transition region 190 is also delineated in FIG. 23. The location along the fuselage 102 where the aft double deck 152 begins can vary. Two possible locations include at the aft wheel well pressure bulkhead 129, the wing center section, delineated by the line 192 in FIGS. 23 and 25, and at the aft region of the wing-to-body fairing 122, such as the trailing edge 174 of the wing-to-body fairing, for example. Other transition locations can also be selected. In the embodiment shown in FIGS. 25 and 26, the forward and aft portions of the fuselage 118, 104 are divided at the aft wheel well pressure bulkhead 129. At the location of this aft wheel well bulkhead 129, the main deck 132 ends, and the upper and lower aft decks 156, 158 begin. A stairway 194 is provided to traverse between the main deck 132 and the split level aft decks 156, 158, one portion of the stairway 194a going up from the main deck 132 to the upper second deck 156, and another portion of the stairway 194b going down from the main deck 132 to the lower third deck 158. The split-level stairway 194 can be configured similar to any of the embodiments described herein. A second similar stairway (not shown) can also be provided at the aft end of the split level cabin, in a manner similar to that shown and described with respect to FIGS. 6, 7 and 13 above.

The perspective view of FIG. 26 is intended to show a representative structural arrangement for a fuselage structure 102 that can carry aircraft design loads in the transition region 190 between the single main passenger cabin 120 and the split-level passenger deck region 152. This split-level stairways 194 described above are shown in this view, as is a lift 196 that can be used to connect the different level decks. This lift 196 can be configured for use by passengers, crew and for transporting other items (e.g. galley carts) between the first main deck 132 and the upper and lower decks 156, 158. The lift 196 can be configured and operated in a manner like that shown and described above with respect to FIGS. 16A-C and elsewhere herein. It will be apparent to those skilled in the art that alternate structural configurations can be applied in various embodiments of the fuselage transition section 190.

The view of FIG. 26 shows the diagonal stanchions 166 that are connected between the outer fuselage walls 198 and the upper deck 156, and some additional vertical stanchions 167 and diagonal braces 169 that are provided in the region of the stairways 194, which help support the stairway 194 and increase the strength of the aircraft fuselage structure 102 in the transition region 190. Advantageously, the structure of the lower third floor or deck 158 of this aft fuselage section 104 can be designed to act in tension to resist pressurization loads acting on the side walls 198 of the fuselage 102 when the fuselage is pressurized. This can be desirable given the larger expanse and potentially reduced curvature of the lower portion of the aft fuselage 104 (i.e. the portion of the aft fuselage 104 along the lower mold line 168), which are factors that affect its strength as a pressure vessel.

Figure 27:
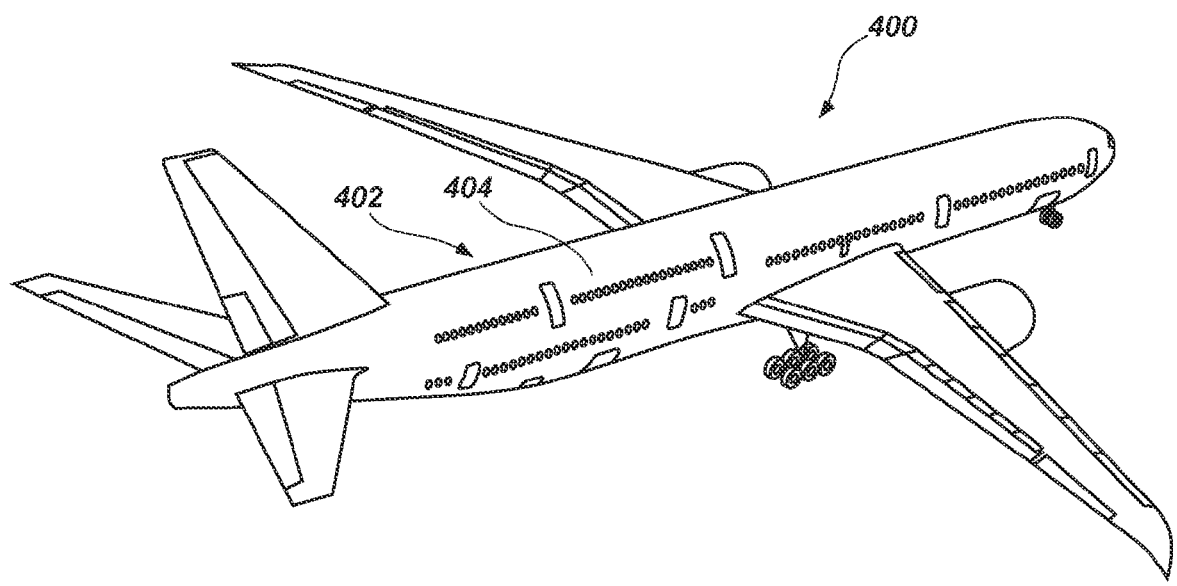
FIG. 27 is an aft right side view of another embodiment of an aircraft having a split level aft double deck with two doors each on the right side of the upper aft deck and two doors on the lower aft deck.
Figure 28:
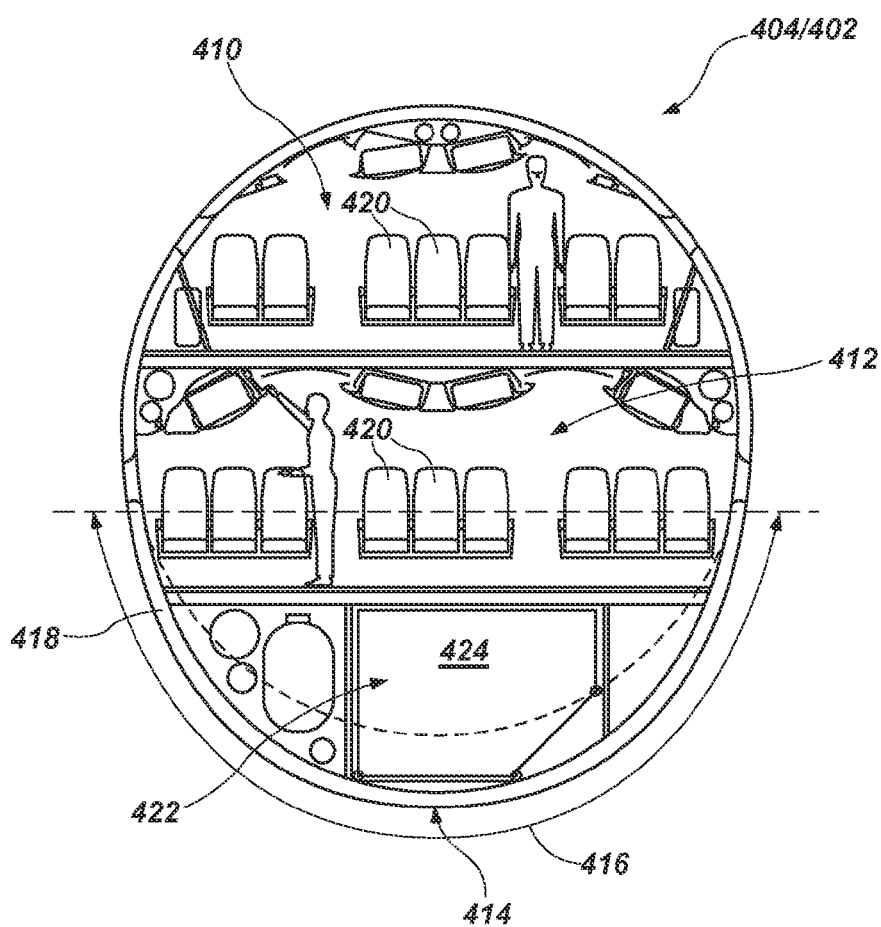
FIG. 28 is a cross-sectional view of the double deck aft fuselage portion of the split level aft double deck aircraft of FIG. 26.
Figure 29:
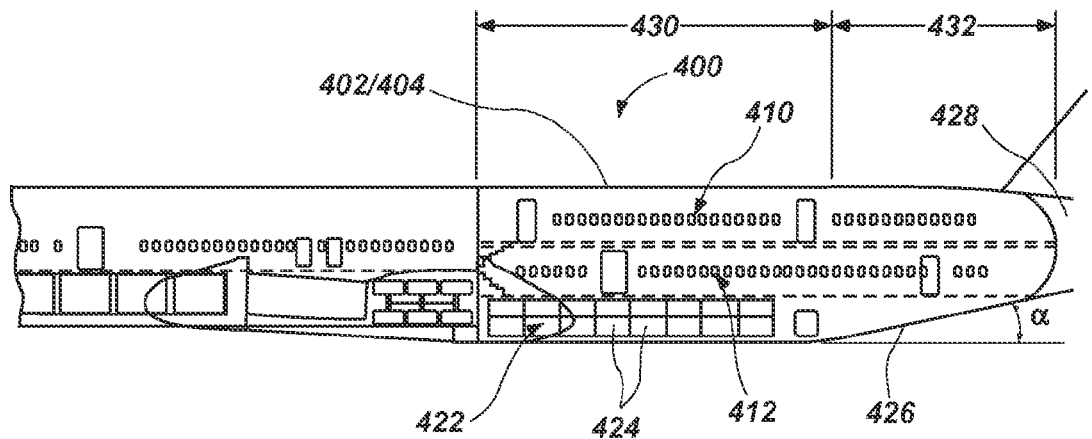
FIG. 29 is a diagrammatic side view of the embodiment of FIGS. 26 and 27.
Figure 30:
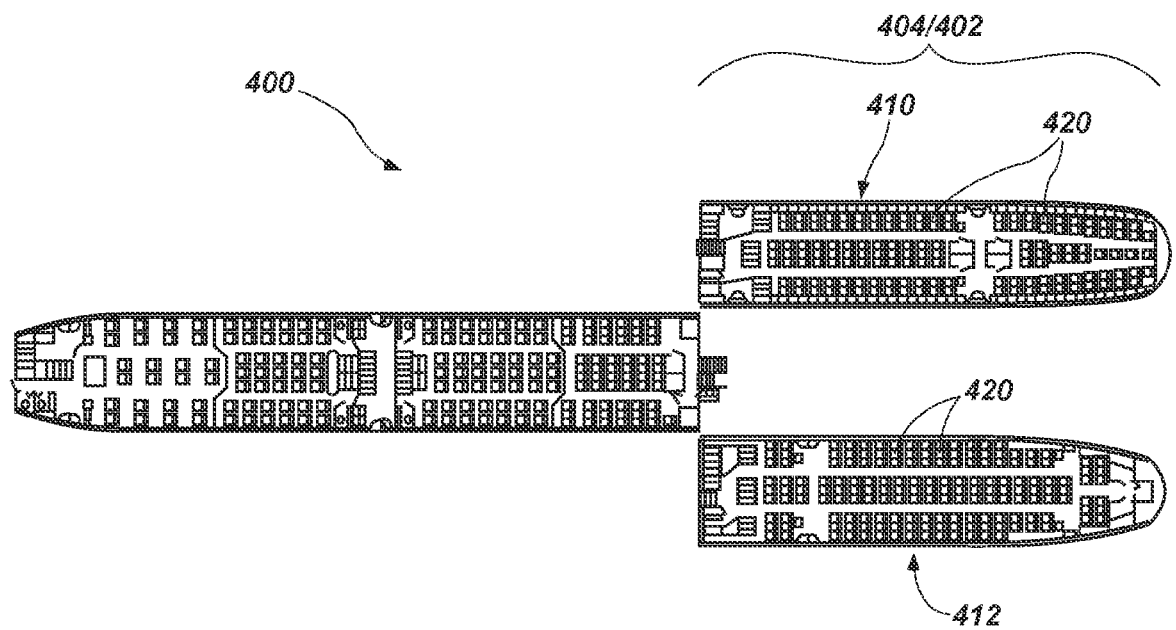
FIG. 30 is a plan view diagram showing one embodiment of a passenger and cargo payload configuration for the split level aft double deck configuration of FIGS. 26-28.

Another embodiment of an aircraft 400 having a split level aft double deck 402 is shown in FIGS. 27-30. Shown in FIG. 27 is an aft right side view of this aircraft 400, and FIG. 28 provides a cross-sectional view of the aft fuselage section 404. In this embodiment the aircraft includes a split level aft double deck, indicated generally at 402, which includes two doors 408a each on the right side of the upper aft cabin 410 and two doors 408b on the right side of the lower aft cabin 412. In this embodiment, the keel 414 is lowered an amount similar to that of the embodiment of FIG. 21, but the lower mold line 416 of the fuselage is more rounded on the lower side, and includes a thinner structural wall 418, with the result that the usable interior space of the lower cabin 412 is slightly wider. Consequently, this embodiment includes passenger seats 420 that are seven-abreast on the upper second deck 410, and nine-abreast in the lower third deck 412, giving an overall greater passenger capacity. The plan view diagram of FIG. 30 shows that this aircraft 400 has a total passenger capacity of 479 passengers, with 142 of the passenger seats 420 on the upper second deck 410, and 168 of the seats being on the lower third deck 412. Like the embodiment of FIG. 21, the second cargo deck 422 is configured to accommodate LD-1 or LD-3 cargo containers 424 in a single row.

As can be seen from the centerline diagram of FIG. 29, the exterior geometry of this aircraft 400 retains and protects the aft taper angle 426 of the base aircraft like the other embodiments disclosed herein, thus retaining the takeoff and landing characteristics of the base aircraft and allowing the unpressurized tail cone section 428 on this aircraft to be the same as that on the base aircraft. The aft taper angle $\alpha$ of the base aircraft is maintained through adjusting the relative lengths of the aft constant section 430 and aft taper section 432, compared to the base aircraft. By using an increased length aft taper section 432 and reduced length aft constant section 430, as shown in FIG. 29, the tailstrike angular margins for takeoff and landing remain substantially unchanged compared to the base aircraft.

Those familiar with aircraft operations and aircraft ground servicing will recognize that an aircraft with a split level aft double deck as disclosed herein may involve a different ground service equipment arrangement than the base aircraft, given different passenger and cargo loading characteristics, door locations, etc. Those of skill in the art will be able to devise service and access arrangements that will be suitable for such an aircraft, and such will not be considered here in any detail.

The aircraft with a split level aft double deck disclosed herein can provide an added family member to a commercial aircraft family. With relatively modest changes to the airframe and little nor no change to the aircraft performance characteristics, a parent or base commercial airplane can have its aft fuselage section changed from a single to a double passenger deck configuration through the use of a deeper (or "taller") cross-section, giving the aircraft a larger passenger capacity. At the same time, the deepened cross-section allows standardized cargo containers to be used in the aft cargo hold, rather than limiting the aircraft to bulk cargo in the aft cargo hold. This configuration is particularly applicable to wide body aircraft, though it could also be applied to other aircraft.

The present disclosure thus presents a method for modifying a base aircraft from a single deck only to an aft double passenger deck configuration, but with the capacity for accepting standardized cargo containers in a cargo deck below the lower aft deck. As discussed above, the base aircraft includes a fuselage having a crown section and a keel, and a first cabin having a first floor at a substantially constant level within a forward portion of the fuselage. The base aircraft also includes a forward cargo deck located below the first floor, and has a base passenger capacity, a base cargo capacity, a maximum takeoff weight and a flight surface geometry.

The method involves lowering an aft portion of the keel while keeping the crown section substantially constant fore-to-aft, and providing a split level cabin within the aft portion of the fuselage. As discussed above, the split level cabin includes an upper second cabin having a second floor above the level of the first floor, and a lower third cabin beneath the upper second cabin and having a third floor below the level of the first floor. The method also includes providing an aft cargo deck, within the lowered aft portion of the fuselage and beneath at least a portion of the lower third cabin. The aft cargo deck can be configured to accommodate cargo containers selected from the group consisting of LD-1, LD-2, LD-3, LD-3-46, LD-3-46W, LD-3-45, and LD-3-45W containers, for example.

Advantageously, the modified aircraft has a passenger capacity that is greater than the base passenger capacity, and a cargo capacity that is less than the base cargo capacity, while keeping the maximum takeoff weight and the flight surface geometry substantially constant. Producing this derivative or modified aircraft can also include the step of providing an upswept undersurface of an aftmost portion of the keel, so that the aftmost portion of the aircraft has an undersurface upsweep selected to enable adequate aft body tailstrike margins suitable for takeoff and landing of the aircraft. These tailstrike margins can be substantially the same as those of the base aircraft.

The method can also include providing an aerodynamic fairing transitioning between the keel of the forward portion of the fuselage and the lowered keel of the aft portion of the fuselage. The aerodynamic fairing can be a wing-to-body fairing, a main landing gear fairing, or a combined wing-to-body and main landing gear fairing, for example. The base aircraft can also be modified by providing a passenger egress door in the third lower cabin, the passenger egress door having a ditching evacuation sill height at a level above a waterline associated with a ditching condition of the aircraft, as discussed above.

The aircraft with split level aft double deck and the method disclosed herein thus provide a novel solution for the reconfiguring of a wide body single deck passenger aircraft to a derivative passenger aircraft, the derivative aircraft having much bigger passenger count with some decrement in revenue cargo capacity. Such changes relative to the parent or original (base) passenger airplane potentially enable coverage of a wider air travel market for a relatively moderate cost and with relatively low risk from a product development standpoint. This configuration offers a practical way to dramatically increase passenger payload and reduce fuel burn per seat-mile, and reduce airplane-related operating cost per seat-mile with only moderate changes of the airframe in the fuselage area only. Most of the main components of the parent or base airplane can remain unchanged, including the cockpit, forward fuselage, wings, engines, landing gear, empennage (vertical tail and horizontal tail), and aft fuselage closure/tailcone. The development cost for this modified aircraft is thus relatively low, and certification issues apply mostly to the derivative airplane fuselage structure and only some aircraft systems, because the MTOW (maximum take-off weight), and wing and tail design loads can be kept substantially the same as the base aircraft, if desired. Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft capable of carrying passengers and cargo, comprising:
a fuselage, having a crown section and a keel;
a main wing;
a first passenger cabin, having a first floor, located in a forward portion the fuselage forward and over the main wing;
a first cargo deck, located below at least a portion of the first passenger cabin;
a split level cabin, located only in an aft portion of the fuselage behind the main wing, the split level cabin including an upper second cabin having a second floor above the level of the first floor, and a lower third cabin beneath the upper second cabin and having a third floor below the level of the first floor; and
a second cargo deck, located in the aft portion of the fuselage and beneath at least a portion of the lower third cabin;
wherein the crown section has a substantially constant cross-sectional shape fore-to-aft above the first passenger cabin and the main wing and the split level cabin, and the keel of the aft portion is lowered compared to the keel of the forward portion, the lowered keel extending linearly from a point aft of the main wing to a point of transition to an upswept undersurface of a tail portion of the aircraft.

2. An aircraft in accordance with claim 1, wherein the lowered keel transitions to an upswept undersurface of an aftmost portion of the fuselage, having an undersurface upsweep selected to enable aft body tailstrike margins suitable for takeoff and landing of the aircraft.

3. An aircraft in accordance with claim 2, further comprising an unpressurized tail cone section, attached to the aftmost portion of the fuselage, having a lower surface defining a continuation of the upswept undersurface of the aftmost portion of the fuselage.

4. An aircraft in accordance with claim 1, wherein the forward and aft portions of the fuselage are divided by one of an aft wheel well pressure bulkhead, a main wing center section, and an aft region of a wing-to-body fairing.

5. An aircraft in accordance with claim 1, further comprising an aerodynamic fairing transitioning between the keel of the forward portion of the fuselage and the lowered keel of the aft portion of the fuselage, the aerodynamic fairing comprising one of (i) a wing-to-body fairing, (ii) a main landing gear fairing, and (iii) a combined wing-to-body and main landing gear fairing.

6. An aircraft in accordance with claim 1, further comprising a passenger egress door in the third lower cabin, the passenger egress door having a ditching evacuation sill height at a level above a ditching waterline associated with a ditching condition of the aircraft.

7. An aircraft in accordance with claim 6, wherein the passenger egress door includes upper and lower portions that may be opened independently of each other.

8. An aircraft in accordance with claim 1, wherein the lower third floor is designed to act in tension to resist pressurization loads acting on the side walls of the fuselage when the fuselage is pressurized.

9. An aircraft in accordance with claim 1, wherein the second cargo deck is configured to accommodate standardized cargo containers, and further comprising first stanchions, supporting the lower third floor on a first side of the fuselage and second stanchions supporting the lower third floor on a second side of the fuselage; and wherein the second cargo deck accommodates the cargo containers between the first stanchions and the second stanchions.

10. An aircraft in accordance with claim 1, wherein the second cargo deck is configured to accommodate cargo containers selected from the group consisting of LD-1, LD-2, LD-3, LD-3-46, LD-3-46W, LD-3-45, and LD-3-45W containers.

11. A modified commercial aircraft, comprising:
a crown section that is substantially identical to a crown section of a base aircraft;
a main wing that is substantially identical to a main wing of the base aircraft;
a forward fuselage portion, forward of and above the main wing, that is substantially identical to the base aircraft, having a first cabin with a first floor level;
an aft fuselage portion having a lowered keel in comparison to the base aircraft, the lowered keel extending linearly from a point aft of the main wing to a point of transition to an upswept undersurface of a tail portion of the aircraft;
an aft split level cabin only within the aft fuselage portion behind the main wing, including an upper cabin having a second floor above the level of the first floor, and a lower third cabin beneath the upper second cabin and having a third floor below the level of the first floor; and
an aft cargo deck, within the lowered aft portion of the fuselage and beneath at least a portion of the lower third cabin;
wherein the modified aircraft has a passenger capacity that is greater than a passenger capacity of the base aircraft, and a cargo capacity that is less than a cargo capacity of the base aircraft.

12. An aircraft in accordance with claim 11, wherein the lowered keel transitions to an upswept undersurface of an aftmost portion of the keel, having an undersurface upsweep providing an aft body tailstrike margin that is substantially identical to a tailstrike angular margin of the base aircraft.

13. An aircraft in accordance with claim 12, further comprising an unpressurized tail cone section, attached to the aftmost portion of the fuselage, the tail cone section being substantially identical to an unpressurized tail cone section of the base aircraft, and having a lower surface defining a continuation of the upswept undersurface of the aftmost portion of the fuselage.

14. An aircraft in accordance with claim 11, further comprising a modified fairing on the belly of the fuselage, the modified fairing defining a transition between the keel of the forward fuselage portion and the lowered keel of the aft fuselage portion, the modified fairing being at least one of a wing-to-body fairing, a main landing gear fairing and an air conditioning system covering fairing.

15. An aircraft in accordance with claim 11, wherein the aft cargo deck is configured to accommodate cargo containers selected from the group consisting of LD-1, LD-2, LD-3, LD-3-46, LD-3-46W, LD-3-45, and LD-3-45W containers.

16. A method for modifying a base aircraft comprising a main wing; a fuselage, including a crown section and a keel; a first cabin, having a first floor at a substantially constant level within a forward portion of the fuselage forward of and over the main wing; a forward cargo deck located below the first floor; and a base passenger capacity, a base cargo capacity, a maximum takeoff weight and a flight surface geometry, the method comprising:

lowering an aft portion of the keel from a point aft of the main wing, linearly to a point of transition to an upswept undersurface of a tail portion of the aircraft, while keeping the crown section substantially constant fore-to-aft;

providing a split level cabin only within an aft portion of the fuselage behind the main wing, the split level cabin including an upper second cabin having a second floor above the level of the first floor, and a lower third cabin beneath the upper second cabin and having a third floor below the level of the first floor; and providing an aft cargo deck, within the lowered aft portion of the fuselage and beneath at least a portion of the lower third cabin;

wherein the modified aircraft has a passenger capacity that is greater than the base passenger capacity, and a cargo capacity that is less than the base cargo capacity.

17. A method in accordance with claim 16, further comprising providing an upswept undersurface of an aftmost portion of the keel, having an undersurface upsweep selected to enable aft body tailstrike margins suitable for takeoff and landing of the aircraft.

18. A method in accordance with claim 16, further comprising providing an aerodynamic fairing transitioning between the keel of the forward portion of the fuselage and the lowered keel of the aft portion of the fuselage, the aerodynamic fairing comprising one of (i) a wing-to-body fairing, (ii) a main landing gear fairing, and (iii) a combined wing-to-body and main landing gear fairing.

19. A method in accordance with claim 16, further comprising providing a passenger egress door in the third lower cabin, the passenger egress door having a ditching evacuation sill height at a level above a ditching waterline associated with a ditching condition of the aircraft.

20. A method in accordance with claim 16, further comprising adapting the aft cargo deck to accommodate cargo containers selected from the group consisting of LD-1, LD-2, LD-3, LD-3-46, LD-3-46W, LD-3-45, and LD-3-45W containers.

* * * * *